US00RE44685E

(19) United States
(12) Reissued Patent
Joseph et al.

(10) Patent Number: US RE44,685 E
(45) Date of Reissued Patent: *Dec. 31, 2013

(54) APPARATUS FOR TRANSMITTING AND RECEIVING EXECUTABLE APPLICATIONS AS FOR A MULTIMEDIA SYSTEM, AND METHOD AND SYSTEM TO ORDER AN ITEM USING A DISTRIBUTED COMPUTING SYSTEM

(75) Inventors: Kuriacose Joseph, Gaithersburg, MD (US); Ansley Wayne Jessup, Willingboro, NJ (US); Vincent Dureau, Palo Alto, CA (US); Alain Delpuch, Paris (FR)

(73) Assignee: OpenTV, Inc., San Francisco, CA (US)

( * ) Notice: This patent is subject to a terminal disclaimer.

(21) Appl. No.: 09/903,457

(22) Filed: Jul. 10, 2001

(65) Prior Publication Data

US 2002/0038257 A1 Mar. 28, 2002

Related U.S. Patent Documents

Reissue of:
(64) Patent No.: 5,819,034
Issued: Oct. 6, 1998
Appl. No.: 08/233,908
Filed: Apr. 28, 1994

U.S. Applications:
(62) Division of application No. 09/672,523, filed on Sep. 27, 2000.

(51) Int. Cl.
*G06F 15/16* (2006.01)

(52) U.S. Cl.
USPC ..... 709/201; 705/26.1; 705/27.1; 709/346; 386/330; 725/43; 725/50; 725/117; 725/132; 375/E7.024; 712/28

(58) Field of Classification Search
USPC ..... 705/1, 26, 26.1, 27.1; 348/E7.056
See application file for complete search history.

(56) References Cited

U.S. PATENT DOCUMENTS 3,803,491 A 4/1974 Osborn
3,891,792 A 6/1975 Kimura (Continued)

FOREIGN PATENT DOCUMENTS

EP 0 145 063 A2 6/1985
EP 0 145 063 B1 6/1985

(Continued)

OTHER PUBLICATIONS

Zachary et al., "Technology: HP is building Gadget to Make TVS Interactive"; Wall Street Journal; New york; Feb. 27, 1992 from Proquest database online (hereinafter Zachary).*

(Continued)

*Primary Examiner* — Yogesh C Garg
(74) *Attorney, Agent, or Firm* — Schwegman Lundberg & Woessner, P.A.

(57) ABSTRACT

A distributed computer system, as for transmitting and receiving executable multimedia applications, includes a source of a continuous data stream repetitively transfering data representing a distributed computing application and a client computer, receiving the data stream, for extracting the distributed computing application representative data from the data stream, and executing the extracted distributed computing application.

46 Claims, 3 Drawing Sheets

(56) References Cited

U.S. PATENT DOCUMENTS 4,163,255 A 7/1979 Pires
4,247,106 A 1/1981 Jeffers et al.
4,264,925 A 4/1981 Freman et al.
4,277,838 A 7/1981 Chambers
4,290,142 A 9/1981 Schnee et al.
4,323,922 A 4/1982 Tooder et al.
4,528,589 A 7/1985 Block et al.
4,547,851 A 10/1985 Kurland
RE32,187 E 6/1986 Barden et al.
4,595,951 A 6/1986 Filliman
4,595,952 A 6/1986 Filliman
4,600,921 A 7/1986 Thomas
4,602,279 A 7/1986 Freeman
4,623,920 A 11/1986 Dufresne et al.
4,636,791 A 1/1987 Burke et al.
4,636,858 A 1/1987 Hague et al.
4,652,944 A 3/1987 Tindall
4,680,629 A 7/1987 Fukushima et al.
4,694,490 A 9/1987 Harvey et al.
4,704,725 A 11/1987 Harvey et al.
4,712,131 A 12/1987 Tanabe
4,724,521 A 2/1988 Carron et al.
4,734,858 A * 3/1988 Schlafly ..... 705/26
4,739,310 A 4/1988 Yamamoto
4,740,912 A 4/1988 Whitaker
4,744,080 A 5/1988 Brennand et al.
4,757,498 A 7/1988 Murray
4,766,599 A 8/1988 Miyazaki
4,787,085 A 11/1988 Suto et al.
4,789,863 A 12/1988 Bush
4,789,895 A 12/1988 Mustafa et al.
4,851,994 A 7/1989 Toda et al.
4,866,515 A 9/1989 Tagawa et al.
4,894,789 A 1/1990 Yee
4,908,707 A 3/1990 Kinghorn
4,924,303 A 5/1990 Brandon et al.
4,926,255 A 5/1990 Von Kohorn
4,935,870 A 6/1990 Burk, Jr. et al.
4,937,784 A 6/1990 Masai et al.
4,937,863 A 6/1990 Robert et al.
4,965,825 A 10/1990 Harvey et al.
4,974,252 A 11/1990 Osborne
4,975,771 A 12/1990 Kassatly
4,982,440 A 1/1991 Dufresne et al.
4,984,155 A 1/1991 Geier et al.
4,991,011 A 2/1991 Johnson et al.
5,003,591 A 3/1991 Kauffman et al.
5,005,171 A 4/1991 Modisette et al.
5,010,499 A 4/1991 Yee
5,030,948 A 7/1991 Rush
5,036,314 A 7/1991 Barillari et al.
5,075,773 A 12/1991 Pullen et al.
5,077,607 A 12/1991 Johnson et al.
5,093,718 A 3/1992 Hoarty et al.
5,109,414 A 4/1992 Harvey et al.
5,111,292 A 5/1992 Kuriacose et al.
5,111,296 A 5/1992 Duffield et al.
5,113,259 A 5/1992 Romesburg et al.
5,115,309 A 5/1992 Hang
5,117,354 A 5/1992 Long et al.
5,121,476 A 6/1992 Yee
5,124,909 A 6/1992 Blakely et al.
5,129,080 A 7/1992 Smith
5,132,992 A 7/1992 Yurt et al.
5,138,440 A 8/1992 Radice
5,144,425 A 9/1992 Joseph
5,148,275 A 9/1992 Batter et al.
5,151,989 A 9/1992 Johnson et al.
5,168,356 A 12/1992 Acampora et al.
5,173,589 A 12/1992 Diehl et al.
5,181,107 A 1/1993 Rhoades
5,191,410 A 3/1993 McCalley et al.
5,191,573 A 3/1993 Hair
5,195,092 A 3/1993 Wilson et al.
5,204,897 A 4/1993 Wyman
5,204,947 A 4/1993 Bernstein et al.
5,208,748 A 5/1993 Flores et al.
5,220,420 A 6/1993 Hoarty et al.
5,221,968 A 6/1993 Bugg
5,233,654 A 8/1993 Harvey et al.
5,235,415 A 8/1993 Bonicel et al.
5,251,301 A 10/1993 Cook
5,260,999 A 11/1993 Wyman
5,262,860 A 11/1993 Fitzpatrick et al.
5,287,507 A 2/1994 Hamilton et al.
5,299,197 A 3/1994 Schlafly
5,303,393 A 4/1994 Noreen et al.
5,343,238 A 8/1994 Lappington et al. ..... 348/12
5,343,239 A 8/1994 Lappington et al.
5,347,632 A 9/1994 Filepp et al.
5,355,170 A 10/1994 Eitz et al.
5,361,091 A 11/1994 Hoarty et al.
5,410,343 A 4/1995 Coddington et al.
5,418,559 A 5/1995 Blahut
5,440,632 A 8/1995 Bacon et al.
5,440,744 A 8/1995 Jacobson et al.
5,465,387 A * 11/1995 Mukherjee ..... 455/26.1
5,469,206 A 11/1995 Strubbe et al.
5,469,431 A 11/1995 Wendorf et al.
5,485,197 A 1/1996 Hoarty
5,485,221 A 1/1996 Banker et al.
5,497,185 A 3/1996 Dufresne et al.
5,497,420 A * 3/1996 Garneau et al. ..... 380/240
5,539,449 A 7/1996 Blahut et al.
5,548,532 A 8/1996 Menand et al.
5,559,549 A 9/1996 Hendricks et al.
5,581,270 A 12/1996 Smith et al.
5,581,704 A 12/1996 Barbara et al.
5,583,560 A 12/1996 Florin et al.
5,600,364 A 2/1997 Hendricks et al.
5,621,456 A * 4/1997 Florin et al. ..... 725/43
5,627,940 A 5/1997 Rohra et al.
5,640,501 A 6/1997 Turpin
5,640,577 A 6/1997 Scharmer
5,657,414 A 8/1997 Lett et al.
5,663,757 A 9/1997 Morales
5,664,111 A 9/1997 Nahan et al.
5,666,293 A 9/1997 Metz et al.
5,706,435 A 1/1998 Barbara et al.
5,715,314 A 2/1998 Payne et al.
5,715,399 A 2/1998 Bezos
5,727,163 A 3/1998 Bezos
5,729,549 A 3/1998 Kostreski et al.
5,734,589 A 3/1998 Kostreski et al.
5,737,595 A 4/1998 Cohen et al.
5,745,681 A 4/1998 Levine et al.
5,757,416 A 5/1998 Birch et al.
5,758,126 A 5/1998 Daniels et al.
5,768,539 A 6/1998 Metz et al.
5,793,302 A * 8/1998 Stambler ..... 340/5.86
5,805,825 A 9/1998 Danneels et al.
5,819,034 A 10/1998 Joseph et al.
5,822,324 A 10/1998 Kostresti et al.
5,826,166 A 10/1998 Brooks et al.
5,847,750 A 12/1998 Srivastava et al.
5,848,399 A 12/1998 Burke
5,936,659 A 8/1999 Viswanathan et al.
5,951,639 A 9/1999 MacInnis
5,960,411 A 9/1999 Hartman et al.
5,963,924 A 10/1999 Williams et al.
5,973,684 A 10/1999 Brooks et al.
5,973,747 A 10/1999 Goreta
5,978,855 A 11/1999 Metz et al.
5,990,927 A 11/1999 Hendricks et al.
6,130,898 A 10/2000 Kostreski et al.
6,185,585 B1 2/2001 Sequeira
6,188,436 B1 2/2001 Williams et al.
6,195,364 B1 2/2001 Brodigan
6,222,530 B1 4/2001 Sequeira

(56) References Cited

U.S. PATENT DOCUMENTS

| | | | |
|---|---|---|---|
| 6,240,448 | B1 | 5/2001 | Imielinski et al. |
| 2004/0261127 | A1 | 12/2004 | Freeman et al. |
| 2008/0178222 | A1 | 7/2008 | Bennington et al. |

FOREIGN PATENT DOCUMENTS

| | | | |
|---|---|---|---|
| EP | 0145063 | A2 | 6/1985 |
| EP | 0 306 208 | A2 | 3/1989 |
| EP | 0 399 300 | A2 | 11/1990 |
| EP | 0 582 196 | A1 | 8/1993 |
| EP | 0 570 683 | A2 | 11/1993 |
| EP | 0 570 683 | A3 | 11/1993 |
| EP | 0570683 | A2 | 11/1993 |
| EP | 0 583 186 | A1 | 2/1994 |
| EP | 0 583 186 | B1 | 2/1994 |
| EP | 0583186 | A1 | 2/1994 |
| EP | 0594353 | | 4/1994 |
| EP | 0680185 | A2 | 11/1995 |
| EP | 0845747 | A2 | 6/1998 |
| EP | 0855659 | A1 | 7/1998 |
| EP | 0855687 | A2 | 7/1998 |
| EP | 0883076 | A2 | 12/1998 |
| GB | 2249416 | A | 5/1992 |
| GB | 2280977 | | 2/1995 |
| JP | 61049574 | | 3/1986 |
| JP | 61072486 | | 4/1986 |
| JP | 62-286489 | | 12/1987 |
| JP | 63028143 | | 2/1988 |
| JP | 01221944 | A2 | 9/1989 |
| JP | 01316788 | A2 | 12/1989 |
| JP | 02105195 | | 4/1990 |
| JP | 04127688 | | 4/1992 |
| JP | 05081034 | | 4/1993 |
| JP | 05081035 | | 4/1993 |
| JP | 2005-236437 | | 9/1993 |
| JP | 06-089252 | | 3/1994 |
| JP | 06-090409 | | 3/1994 |
| JP | 2011-112423 | | 4/2001 |
| JP | 2001-220925 | | 8/2001 |
| JP | 2003-012738 | | 1/2003 |
| JP | 2004127688 | A | 4/2004 |
| JP | 2004-156875 | | 6/2004 |
| WO | WO-9206438 | A1 | 4/1992 |
| WO | WO-9310605 | A1 | 5/1993 |
| WO | WO-9322876 | A1 | 11/1993 |
| WO | WO 95/30961 | | 11/1995 |
| WO | WO 96/17466 | | 6/1996 |
| WO | WO 96/38799 | | 12/1996 |
| WO | WO 98/21679 | | 5/1998 |

OTHER PUBLICATIONS

Kristol, D, et al. "HTTP State Management Mechanism", *Bell Laboratories, Lucent Technologies,* Feb. 1997, pp. 1-21, Network Working Group, Web Page: http://www.cis.ohio-state.edu/cgi-bin/rfc/rfc2109.html.

"Strictly Exchange Online Auction Software", *All CruiseAuction.com,* No Date Given, pp. 1-3, Web page: http:/www.autionhosting.com/.

Ketchpel, Steven P, et al., "Shopping Models: A Flexable Architecture for Information Commerce", *Proceeding of the 2nd ACM International Conference on Digital Libraries.* Jul. 25-28, 1997, pp. 65-74, ACM Press, Philadelphia, PA, USA.

Wilcox, Andrew., "MiniVend—multi-catalog shopping cart and mall", *Describes Mini Vend 2.03, Verssion 0.2, with portions from Vend 0.3.,* No Date Given, pp. 1-93, Web Page: http://bill.minivend.com/2simp/mimivend.html.

Berners-Lee, T., "Hypertext Markup Language—2.0", *Network Working Group MIT/W3C RFC 1866,* Nov. 1995, pp. 1-51.

Greenspun, Philip, "Chapter 14: Ecommerce" *Philip And Alex's Guide to Web Publishing,* No Date Given, pp. 1-31, Web Page: Http://www.arsdigita.com/books/panda/ecommerce.

Bountyquest, "1-Click Prior Art" Web Page: http://www.bountyquest.com/patentinfo/oneclickart.htm, No Date Given, pp. 1-8, bountyquest.

Carcione, Frank, J., "Quarterly Report", *Telvue Corp. 10-Q,* Sep. 30, 1995, pp. 1-10, Washington, DC., Web page: http://www.secinfo.com/dpJXs.a6.htm.

Swift, Tammy, "The everchanging maketplace: From the neighborhood grocery to the hyperstores of today", *The Forum,* Aug. 18, 1999, pp. 1-7, The Everchanging marketplace Web page: http://www.inforum.com/specials/century/jan3/week34.html.

Albright, Thomas B., "Simple Internet Purchase Procedure" Web Page: http://www.bountyquest.com/images/b1025_17a.jpg, pp. 1, No Date Given.

"Diagram of Example Operation", Web Page: http://www.bountyquest.com/images/b1025_17b.jpg, p. 1, No Date Given.

startrek.com: The official Star Trek Web Site! Web Page: http://www.startrek.com/, p. 1-2, No Date Given.

"Contents Table of Contents", *ISPF V4R2.0 User's Guide,* Oct. 9, 1995, pp. 1-9, Document No. SC34-4484-01, IBM BookManager, Web Page: http://publib.boulder.ibm.com/cgi-bin/bookmgr/BOOKS/ISPUGD02/CCONTENTS.

M-CAM, Inc. "Intellectual Property Analysis of Amazon's U.S. Patent No. 5,960,411", *Patently Obvious Litigation Report,* M-Cam.com, Mar. 2, 2001, pp. 1-6, NE Charlottesville, VA.

Bountyquest, "1-Click Patent: No Exact Match But Runners Up Will Split $10,000 Cash Prize", Bountyquest.com, No Date Given, pp. 1-3, Web Page: http://www.bountyquest/infocenter/iclick.htm.

O'Reilly, Tim, "Reilly Awards $10,000 1-Click County to Three "Runners Up"", *O'Reilly Network, Patents DEVCENTER,* Mar. 14, 2001, pp. 1-5, Web Page: http://www.oreillynet.com/pub/a/patents/2001/03/14/bounty.html.

"barnesandnoble.com's Proposed Findings of Fact and Conclusions of Law", *amazon.com, Inc.* v. *barnesandnoble.com, Inc. and barnesandnoble.com, LLC,* No. C99-1695P, filed Nov. 22, 1999,United States District Court, Western District of Washington at Seattle.

Declaration of Steven I. Wallach in Support of barnesandnoble.com's Opposition to amazon.com's Motion for Preliminary Injunction, *amazon.com, Inc.* v. *barnesandnoble.com.inc. and barnesandnoble.com, LLC,* No. C99-1695P, filed Nov. 8, 1999, United States District Court, Western District of Washington at Seattle.

"Declaration of Professor Martin J. Adelman in Support of barnesandnoble.com's Opposition to amazon.com's Motion for a Preliminary Injunction", *amazon.com, Inc.* v. *barnesandnoble.com, Inc. and barnesandnoble.com, LLC,* No. C99-1695P, filed Nov. 8, 1999, United States District Court, Western District of Washington at Seattle.

"Declaration of John W. Lockwood in Support of barnesandnoble.com's Opposition to amazon.com's Motion for a Preliminary Injunction", *amazon.com, Inc.* v. *barnesandnoble.com.inc. and barnesandnoble.com, LLC,* No. C99-1695P, filed Nov. 8, 1999, United States District Court, Western District of Washington at Seattle.

barnesandnoble.com's Opposition to amazon.com's Motion for a Preliminary Injunction, *amazon.com, Inc.* v. *barnesandnoble.com.inc. and barnesandnoble.com, LLC,* ,No. C99-1695P, filed Nov. 8, 1999, United States District Court, Western of Washington at Seattle.

"Order on Plantiff's Motion for Preliminary Injunction", *amazon.com, Inc.* v. *barnesandnoble.com.inc. and barnesandnoble.com, LLC,* , No. C99-1695P, decided Dec. 1, 1999, United States District Court, Western District of Washington at Seattle.

Appeal, *amazon.com, Inc.* v. *barnesandnoble.com.inc. and barnesandnoble.com, LLC,* 00-1109, Decided Feb. 14, 2001, United States Court of Apeals for the Federal Circuit.

"Doonsbury" by G. B. Trudeau, May 2 through May 8, 1992, www.doonsbury.com.

Green N, Hedger J, "ORACLE on Independent Television" Sep. 1976.

Hedger, J, "Broadcast Telesoftware: Experience with ORACLE" Online conferences Ltd., 1980.

Ammar M H, Wong JW, "The Design of Teletext Broadcast Cycles" Elsevier Science Publishers B.V., 1985. [Wong's group, Dept of Computer Science, University of Waterloo, Ontario, Canada].

(56) References Cited

OTHER PUBLICATIONS

Gifford D K, Lucassen J M, Berlin S T, "The Application of Digital Broadcast Communication to Large Scale Information Systems" IEEE Journal on Selected Areas in Communications, vol. SAC-3, No. 3, May 1985. [MIT lab, Gifford's group].
Wong J W, "Broadcast Delivery" Proceedings of IEEE, vol. 76, No. 12, Dec. 1988.
Herman G, Gopal G, Lee K C, Weinrib A, "The Datacycle Architecture for Very High Throughput Database Systems" Proceedings of Association for Computing Machinery Special Interest Group on Management of Data, 1987 Annual Conference, San Francisco, May 27-29, 1987. [Bell Lab, Herman & Gopal's group, Bell Communications Research, Inc., Morristown, NJ.]
Gifford D K, "Polychannel Systems for Mass Digital Communication" Communications of ACM, vol. 33, No. 2, Feb. 1990. [MIT lab, Gifford's group].
Bowen T F, Goapl G, Herman G, Hickey T, Lee K C, Mansfield W H, Raitz J, Weinrib A, "The Datacycle Architecture" Communications of the ACM, vol. 35, No. 12, Dec. 1992.
Antonelli C J, Honeyman P, "Integrating Mass Storage and File Systems", Proceedings, Twelfth IEEE Symposium on Mass Storage Systems, Apr. 26-29, 1993. Monterey, CA.
Zdonik S, "Are "Disks in the Air" Just Pie in the Sky?" IEEE, Workshop on Mobile Computing Systems and Applications, Santa Cruz, CA, Dec. 1994. [Brown's lab, Zdonik's Group, Dept. of Computer Science, Brown Univ., affiliated with Dept. of Computer Science, University of Maryland].
Acharya S, Alonso R, Franklin M, Zdonik S, "Broadcast Disk: Data Management for Asymmetric Communication Environments" Proceedings of the ACM SIGMOD International conference on Management of Data, San Jose, CA May 1995 (first published in Brown University Technical Report CS-94-43, Oct. 1994).
Acharya S, Alonso R, Franklin M, Zdonik S, "Dissemination-based Data Delivery Using Broadcast Disks" IEEE Personal Communications, vol. 2(6), 50-60, 1995.
Imielinski T, Viswanathan S, Badrinath B R, "Power Efficient Filtering of Data on Air" Advances in Database Technology—EDBT '94, Proceedings, 4th International conference on Extending Database Technology, Cambridge, United Kingdom, Mar. 28-31, 1994. [Rutger's group, Imielinski's lab, Dept. of Computer Science, Rutgers University].
Imielinski T, Viswanathan S, Badrinath B R, "Energy Efficient Indexing on Air" Proceedings of the 1994 ACM SIGMOD, International Conference on Management of Data, Minneapolis, Minnesota, May 24-27, 1994.
Imieliski T, Badrinath B R, "Mobile Wireless Computing" Communications of the ACM, vol. 37, No. 10, Oct. 1994.
Dr. Hisham Ei-Shishiny, et al., "A Regional Broadcast-Centric Education System", IEEE Symposium on Computers and Communications, Alexandria, Egypt, Jul. 1-3, 1997.
Ananymous, "Internet Gets Shopping Mall", Information & Interactive Services Report, Apr. 22, 1994, vol. 15, No. 8, 1 page.
Brody, Herb, Information Highway: Technology Review, Aug./Sep. 1993, vol. 96, No. 6, p. 30.
Rice, Dale, Centralization, Standardization Are "Way to Go", American Banker, Mar. 9, 1987, vol. 152, No. 46, p. 11.
Poole et al., "Cable TV Plugs Into Internet", Unix World, Nov. 1993, vol. X, No. 11, p. 16.
Yamada, Ken, "Hewlett Devises Way for Palm-Top PC to be linked to "Interactive" Television", Wall Street Journal, Oct. 7, 1992, p. B3.
Zachary, G Pascal, "Technology: HP is Building Gadget to Make TVs Interactive", Wall Street Journal, Feb. 27, 1992, p. B1.
European Search Report-EP 95 10 5803, Mar. 6, 2002.
Satellite Broadcasting and Communications Association; SSBCA Satellite Industry Key Dates; http://www.scba.com/ket_data.html; LBRT167554-LBRT167552; copyright 1998-2002; pp. 1-15.
Florida Today Space Online; "GE pacenet to Merge with Gilat"; http://www.floridaoday.com/space/explore/stories/1998b/100498f.htm; Oct. 4, 1998; LBRT167572-LBRT167577.
Adaptive Micro-Ware Inc.; LBRT167568-LBRT167571; no date given.
www.satbiznews.com; "A Look Back at 1991"; http://www.sabiznews.com/91look.html; LBRT167548-LBRT167552; 1991.
Smithson, P.M., et al., "The Development of an Operational Computer Based Satellite Data Broadcasting System", Tenth International Conference on Digital Satellite Communications (Conf. Publ. No. 403) Pat vol. 2 p. 405-12 vol. 2, Publisher IEEE, London, UK, Publication date: 1994 Country of Publication: UK 2 vol. (712) pp.
Fujimoto, et al., "Matsushit Data Multiplex System for Satellite Communications", Journal: National Technical Report, vol. 39, No. 3, p. 316-23, Publication Date: Jun. 1993, Country of Publication: Japan.
Chouinard, G., "Broadcasting of HDTV: Beyond the Vision Signal", Third International Colloquium on Advanced Television Systems: HDTV '87. Colloquium Proceedings, p. 4/7/1-23, Publisher: CBC Eng, Montreal, Que., Canada, Publication Date: 1988 Country of Publication: Canada 2 vol. (674+148) pp., p. vol. 1.
Chambers, J.P., "BBC Datacast—The Transmission System", Journal: Electronics & Wireless World, vol. 92, No. 1609, p. 95-8, Publication Date: Nov. 1986, Country of Publication: UK.
Stallard, W.G., "Data Broadcasting", Corporate Source: Independent Broadcasting Authority, London, Engl, Source: IBA Technical Review (Independent Broadcasting Authority) n 24, Nov 1988, p. 48-49, Publication Year: 1988.
Nishizawa Taiji, et al., Jpn. Broadcast, Corp, Sci. and Tech. Res. Lab.; Tokyo Bradcast. Syst., Inc.; Matsushitadenkisangyo Eizoonkyojohoken Terebijon Gakkaishi (Journal of the Institute of Television Engineers of Japan), 1994, Vol. 48, No. 7, p. 794-803, FIG. 4, TBL. 4, REF. 56, Journal No. F0330ABG, ISSN No. 0386-6831.
Mukuhira Yasuhiro, et al., VPT System for VHS VCR, Sanyo Electric Co., Ltd., Sanyo Tech Rev, 1990, vol. 22, No. 1, p. 3-9, FIG. 7, REF 5, Journal No. F0222AAV ISSN No. 0285-516X CODEN: STRVD.
Bereiter, Philips, Video-on-Demand vor, Blick durch die Wirtschaf—Beilage zur Frankfurter Allgemeinen Zeitung, v37, n71 Apr. 13, 1994, pp. 8, 1994.
Stallings, William, "Consultative Committee on International Telegraphy and Telephony", Telecommunications, v24, n3, p. 29(5), Mar. 1990.
Richards, T., et al., "The Interactive Island-Singapore's Teleview System", Journal: IEEE Review vol. 37, No. 7 p. 259-63, Publication Date: Jul. 18, 1991 Country of Publication: UK.
Mulner, H., et al., "Modern Videotex Services and Interactive Telesoftware", Inst. for Info Process., Tech. Univ. Gaz, Austria, Videotex International,.Proceedings of the Conference p. 345-51, Publisher: Online Int. Pinner, UK, Publication Date: 1985 Country of Publication: UK xiv+404 pp.
Yang, D.J., et al.. "Proposed Home Information System in Taiwan: Videoinfo system", Industrial Technology Research Inst, Hsinchu, Taiwan, Chicago, IL, USA, Digest of Technical Papers—IEEE International Conference on Consumer Electronics 1994. IEEE, Pisataway, NJ, USA, 94CH3363-9. p. 178-179, Publication Year: 1994.
Anon, "Conference on Electronic Delivery of Data and Software", London, Engl Conference Date: Sep. 16, 1986, Sponsor: IERE, London, Engl, Publ Inst Electron Radio Eng n. 69. Publ by IERE, London, Engl 145p.
Van Den Boom, Henrie, "Interactive Videotex System For Two-Way CATV Networks", Eindhoven Univ of Technology, Eindhoven, Neth, AEU, Archiv fue Elektronik & Uebertragungstechnik: Elect. & Com. v40 n 6 Nov.-Dec. 1986 p. 397-401, Publ. Year: 1986.
Pongratz, Hanns Joerg, "Computer Graphics in Videotex", T echnischen Univ Grax, Inst fuer Informationsverarbeitung, Grax, Austria, Angewandte Informatik, Applied Informatics v. 27 n 6 Jun. 1985 p. 232-238, Publication year: 1985.
Representative ITV services. (Interactive Television) (Is ITV Here to Stay?), Byte, v18, n2, p. 141(1), Feb. 1993.
Woolnough, Roger, Teleview Puts Datacom On Screen—Hybrid videotex melds phone, TV, Electronic Engineering Times, 1988, N 499,49, Publication Date: Aug. 15, 1988.

(56) References Cited

OTHER PUBLICATIONS

Brown, L.J., et al., "BBC Telesoftware—3 Years On", Affiliation: BBC Enterprises Ltd., London, UK, Conference on Electronic Delivery of Data and Software, (Publ. No. 69) p. 35-8, Publisher: IERE, London, UK, Publication Date: 1986 Country of Publication: UK 160 pp.
Guenot, A., "CIDAC: Integrated Circuit for Acquisition and Control (In Teletext)", RTC-Compelec, Paris, France, Journal: Acta Electraonica vol. 27, No. 1-2 p. 139-44, Publication Date: 1985 Country of Publication: France.
Smithson; P.M., et al., "The Development of an Operational Computer Based Satellite Data Broadcasting System", Plymonth Univ., UK, Tenth International Conference on Digital Satellite Communications (Con. Publ. No. 403) Part vol. 2 p. 405-12 vol. 2, Publisher: IEEE, London, UK, Publication Date: 1994 Country of Publication: UK 2 vol.
D'Amato, P., et al., "Datavideo: the New Data Broadcasting System Through Television Channels", Televideo RAI, Roma, Italy, Journal: Electronica c Telecomunicazioni vol. 40, No. 2 p. 65-74, Publ. Date: Aug. 1991 Country of Publication: Italy.
Ohtsuki, M., et al. "Experimental Receiving System For TV-Multiplexed Data Broadcasting", R& D Lab., NEC Home Electron. Ltd., Tokyo, Japan , Journal: NEC Technical Journal vol. 42, No. 5 p. 10-15, Publication Date: Apr. 1989 Country of Publication: Japan.
Temesi, A., et al.. "Telesoftware—The Simple Way", Inst. of Telecommun. Electron., Budapest Tech. Univ., Hungary, Publisher: North-Holland, Amsterdam, Netherlands, Publication Date: 1988 Country of Publication: Netherlands x+225 pp.
Stow, R.G., "Receiving Conditional Access Teletext", Philips Consumer Electron., Croydon, UK, IEEE Colloquium on Encryption for Cable and DBS' (Digest No. 24) p. 5/1-4, Publisher: IEEE, London, UK, Publication Date: 1986, Conference Location: London, UK.
Ohtsuki Mitsuhiro, et al. "Experimental Receiving System for TV-Multiplexed Data Broadcasting", NEC Home Electronics Ltd., R & O Labs, NEC Giho (NEC Technical Journal), 1989, Vol. 42, No. 5, p. 10-15, FIG. 12, TBL. 2, REF.5.
Cominetti M., et al., "Data Broad Casting Services", cent. ric., Torino Italy, Journal: Electronica e Telecomunicazioni, 1990. 39 (2) 83-88, Country of Publication: Italy.
Bundy, Matthew J., "SkyPix System Design", Doc. No. 920162-K-02-01-0.2, Project: SkyPix System, Customer: Starscan, Adaptive Micro-Ware, Inc, pp. 1-18, Appendix A-1-A-8.
Bundy, Matthew J., "SkyPix System Specification", Doc. No. 920162-K-02-01-0.11, Project: SkyPix System, Customer: Starscan, Adaptive Micro-Ware, Inc, pp. 1-12, Appendix A.
Menu Object, Description: A Menu Object, An Image Bitmap, Palette_Colors—Number of colors in palette, Adaptive Micro-Ware, Inc.
Menu Header, Description: A Menue Header, Entry_Count—The number of header entries to follow., Menu Scroll, Description: A menu scroll, Menu Footer, Description: A menu footer, Info Block, Description: An information block, Adaptive Micro-Ware, Inc.
Lumbatis, Kurt, "Menu Object Data Specification", Doc. No. 921001-A-01-0.4, Project: Menu Generation, customer: Starscan, Adaptive Micro-Ware,Inc., pp. 1-17, Appendix A-B.
Reilly, Mark L., "Specification", Doc. No. 921071-A-02-02-0.4, Project: Data Object Delivery Interface, Customer: Northwest Starscan, Adaptive Micro-Ware, Inc., pp. 1-8.
Reilly, Mark L., "Comm Frame Specification", Doc. No. 912621-A-01-01-1.3, Project: starscan Data Delivery, Customer: Northwest Starscan, Adaptive Micro-Ware, Inc., pp. 1-14.
Clark, Derek, "Specification", Doc. No. 900171-F-10-01-2.0, Project: Comm Frame Data specification, Customer: Starscan, Adaptive Micro-Ware, Inc., pp. 1-121.
Reilly, Mark L., Memorandum, Subject: Fractional Channel Frame Formats, Oct. 2, 1991, Adaptive Micro-Ware, Inc, Technology Development, Adaptive Micro-Ware, Inc.
Reilly, Mark L., Critical Issues Update, Issue Heading: Comm Frame Spec, Oct. 28, 1991, Adaptive Micro-Ware, Inc, Technology Development, Adaptive Micro-Ware, Inc.
"National Association of Broadcasters (NAB) ED—National Association of Broadcasters (NAB): Grand Alliance HDTV System Specification, Passage Text", *Grand Alliance HDTV System Specification. Draft Document submitted to the ACATS Technical Subgroup, Reprint from proceedings of Annual Broadcast Engg. Conference,* Chapter V—Transport System, (Feb. 22, 1994), 7-10.
"U.S. Appl. No. 08/233,908, Advisory Action mailed Feb. 28, 1997", 1 pg.
"U.S. Appl. No. 08/233,908, Final Office Action Mailed Dec. 23, 1996", 6 pgs.
"U.S. Appl. No. 08/233,908, Non-Final Office Action mailed Apr. 11, 1997", 6 pgs.
"U.S. Appl. No. 08/233,908, Non-Final Office Action mailed Jun. 17, 1996", 9 pgs.
"U.S. Appl. No. 08/233,908, Notice of Allowability mailed May 11, 1998", 3 pgs.
"U.S. Appl. No. 08/233,908, Response filed Feb. 7, 1997 to Office Action mailed Dec. 23, 1996", 8 pgs.
"U.S. Appl. No. 08/233,908, Response filed Mar. 18, 1997 to Advisory Action mailed Feb. 28, 1997", 6 pgs.
"U.S. Appl. No. 08/233,908, Response filed Jun. 30, 1997 to Non-Final Office Action Mailed Apr. 11, 1997", 8 pgs.
"U.S. Appl. No. 08/233,908, Response filed Sep. 23, 1996 to Non-Final Office Action Mailed Jun. 17, 1996", 17 pgs.
"U.S. Appl. No. 08/819,274, Advisory Action mailed Sep. 9, 1998", 1 pg.
"U.S. Appl. No. 08/819,274, Final Office Action mailed May 13, 1998", 6 pgs.
"U.S. Appl. No. 08/819,274, Final Office Action mailed Jul. 2, 1998", 5 pgs.
"U.S. Appl. No. 08/819,274, Non-Final Office Action mailed Jan. 7, 1998", 6 pgs.
"U.S. Appl. No. 08/819,274, Notice of Allowance mailed Sep. 25, 1998", 3 pgs.
"U.S. Appl. No. 08/819,274, Preliminary Amendment filed Mar. 18, 1997", 7 pgs.
"U.S. Appl. No. 08/819,274, Response filed Feb. 27, 1998 to Non-Final Office Action mailed Jan. 7, 1998", 10 pgs.
"U.S. Appl. No. 08/819,274, Response filed Jun. 12, 1998 to Final Office Action mailed May 13, 1998", 9 pgs.
"U.S. Appl. No. 08/819,274, Response filed Aug. 28, 1998 to Final Office Action mailed Jul. 2, 1998", 5 pgs.
"U.S. Appl. No. 08/819,274, Response filed Sep. 18, 1998 to Final Office Action maild Jul. 2, 1998", 2 pgs.
"U.S. Appl. No. 09/672,523 Final Office Action mailed May 1, 2006", 31 pgs.
"U.S. Appl. No. 09/672,523 Non Final Office Action mailed Mar. 8, 2004", 6 pgs.
"U.S. Appl. No. 09/672,523 Non Final Office Action mailed May 3, 2007", 36 pgs.
"U.S. Appl. No. 09/672,523 Non Final Office Action mailed Jul. 9, 2003", 44 pgs.
"U.S. Appl. No. 09/672,523 Response filed Apr. 8, 2004 to Non Final Office Action mailed Mar. 8, 2004", 25 pgs.
"U.S. Appl. No. 09/672,523 Response filed Aug. 3, 2007 to Non-Final Office Action mailed May 3, 2007", 14 pgs.
"U.S. Appl. No. 09/672,523 Response filed Nov. 10, 2003 to Non Final Office Action mailed Jul. 9, 2003", 25 pgs.
"U.S. Appl. No. 09/672,523, Final Office Action mailed Nov. 20, 2002", 34 pgs.
"U.S. Appl. No. 09/672,523, Non-Final Office Action mailed Jan. 15, 2002", 36 pgs.
"U.S. Appl. No. 09/672,523, Response filed Feb. 20, 2003 to Final Office Action mailed Nov. 20, 2002", 16 pgs.
"U.S. Appl. No. 09/672,523, Response filed Apr. 15, 2002 to Non-Final Office Action mailed Jan. 15, 2002", 40 pgs.
"U.S. Appl. No. 09/72,523, Notice of Appeal mailed Aug. 1, 2006", 6 pgs.
"U.S. Appl. No. 09/903,091, Non-Final Office Action mailed May 8, 2003", 8 pgs.
"U.S. Appl. No. 09/903,091, Premilinary Amendment mailed Feb. 10, 2001", 13 pgs.

(56) References Cited

OTHER PUBLICATIONS

"U.S. Appl. No. 09/903,091, Response filed Aug. 8, 2003 to Non-Final Office Action mailed Jul. 8, 2003", 20 pgs.
"U.S. Appl. No. 09/903,091 Final Office Action mailed Jan. 11, 2007", 20 pgs.
"U.S. Appl. No. 09/903,091 Final Office Action mailed Aug. 3, 2006", 20 pgs.
"U.S. Appl. No. 09/903,091 Response filed Jan. 3, 2007 to Final Office Action mailed Aug. 3, 2006", 16 pgs.
"U.S. Appl. No. 09/903,448, Non-Final Office Action mailed Jan. 30, 2008", 3 pgs.
"U.S. Appl. No. 09/903,458, Preliminary Amendment mailed Jul. 10, 2001", 3 pgs.
"U.S. Appl. No. 09/903,458, Non-Final Office Action mailed Oct. 12, 2007", 34 pgs.
"International Application Serial No. 03002720.5-1244, European Search Report completed May 22, 2006", 3 pgs.
"International Application Serial No. 03002720.5-1244, Office Action mailed Feb. 19, 2007", 5 pgs.
"International Application Serial No. 03002720.5-1244, Response filed Jul. 3, 2007 to Office Action mailed Feb. 19, 2007", 11 pgs.
"International Application Serial. No. 03002721.3-1244, European Search Report completed May 18, 2006", 3 pgs.
"International Application Serial No. 03002721.3-1244, Office Action mailed Feb. 19, 2007", 6 pgs.
"International Application Serial No. 03002721.3-1244, Response filed Oct. 18, 2007 to Non-Final Office Action mailed Feb. 19, 2007", 7 pgs.
"International Application Serial No. 03002722.1-1244, European Search Report competed May 23, 2006", 3 pgs.
"International Application Serial No. 03002722.1-1244, Office Action mailed Feb. 19, 2007", 5 pgs.
"International Application Serial 03002722.1-1244, Response filed Jul. 3, 2007 to Office Action mailed Feb. 19, 2007", 9 pgs.
"International Application Serial No. 03002723.9, EP Office Action mailed Feb. 19, 2007", 4 pgs.
"International Application Serial No. 03002723.9, European Search Report completed May 19, 2006", 4 pgs.
"International Application Serial No. 03002723.9, Response filed Jul. 3, 2007 to EP Office Action mailed Feb. 19, 2007", 15 pgs.
"International Application Serial No. 95105803.1-1244, First Examiner's Report mailed Oct. 29, 2003", 6 pgs.
"U.S. Appl. No. 09/903,091, Non-Final Office Action mailed Sep. 16, 2008", OARN, 16 pgs.
"U.S. Appl. No. 09/903,448 Final Office Action mailed Sep. 3, 2008", FOAR, 17 pgs.
"U.S. Appl. No. 09/903,448, Response filed May 30, 2008 to Non-Final Office Action mailed Jan. 30, 2008", 44 pgs.
"U.S. Appl. No. 09/903,458, Response filed Oct. 20, 2008 to Final Office Action mailed Aug. 21, 2008", 13 pgs.
"U.S. Appl. No. 09/903,458 Response to Non-Final Office Action filed Apr. 14, 2008", 15 pgs.
"U.S. Appl. No. 09/903,458 Final Office Action mailed Aug. 21, 2008", FOAR, 13 pgs.
"Chinese Application Serial No. 200610093448.8, Office Action mailed Sep. 12, 2008", OAR-MISC, 14 pgs.
"U.S. Appl. No. 09/672,523, Response filed Mar. 30, 2009 to Final Office Action mailed Jan. 6, 2009", 5 pgs.
"U.S. Appl. No. 09/903,091, Final Office Action mailed Apr. 30, 2009", 12 pgs.
"U.S. Appl. No. 09/672,523, Non-Final Office Action mailed Jun. 11, 2009", 16 pgs.
"U.S. Appl. No. 09/672,523, Non-Final Office Action mailed Nov. 18, 2009", 15 pgs.
"U.S. Appl. No. 09/672,523, Pre-Appeal Brief Request filed Aug. 1, 2006", 5 pgs.
"U.S. Appl. No. 09/672,523, Pre-Appeal Brief Request filed Oct. 12, 2009", 5 pgs.
"U.S. Appl. No. 09/903,091, Response filed Jul. 30, 2009 to Final Office Action mailed Apr. 30, 2009", 14 pgs.
"U.S. Appl. No. 09/903,448, Non-Final Office Action mailed Jul. 1, 2009", 12 pgs.
"U.S. Appl. No. 09/903,448, Response filed Nov. 2, 2009 to Non Final Office Action mailed Jul. 1, 2009", 23 pgs.
"U.S. Appl. No. 09/903,458, Examiner Interview Summary mailed Feb. 24, 2009", 2 pgs.
"U.S. Appl. No. 09/903,458, Non-Final Office Action mailed May 29, 2009", 9 pgs.
"U.S. Appl. No. 09/903,458, Response filed Feb. 24, 2009 to Restriction Requirement mailed Feb. 4, 2009", 3 pgs.
"U.S. Appl. No. 09/903,458, Response filed Oct. 29, 2009 to Non Final Office Action mailed May 29, 2009", 10 pgs.
"Chinese Application Serial No. 200610093448.8, Office Action Mailed May 15, 2009", 10 pgs.
"Chinese Application Serial No. 200610101903.4, Office Action mailed Aug. 21, 2009", 5 pages.
"Japanese Application Serial No. 2006-9187, Office Action mailed Jan. 12, 2010", 29 pgs.
"Japanese Application Serial No. 98882/1995, Office Action mailed Aug. 5, 2009", 44 pgs.
"U.S. Appl. No. 09,903,448, Response filed Jun. 6, 2012 to Non Final Office Action mailed Jan. 6, 2012", 20 pgs.
"U.S. Appl. No. 09/903,448, Final Office Action mailed Aug. 15, 2012", 14 pgs.
"Chinese Application Serial No. 200610101903.4, Office Action mailed Jan. 12, 2012", 12 pgs.
"Chinese Application Serial No. 200610101903.4, Response filed Apr. 27, 2012 to Office Action mailed Jan. 12, 2012", 7 pgs.
"European Application Serial No. 03002723.9, Notice of Opposition mailed May 31, 2012", 6 pgs.
"Information Technology—Coding of Moving Pictures and Associated Audio For Digital Storage Media at up to About 1,5 Mbits/s—Part 3: Audio", © ISO/IEC1993, ISO/IEC International Standard 11172-3, (Aug. 1, 1993), 60 pgs.
"Japanese Applicatiion Serial No.2010-185225, Office Action Response filed Feb. 23, 2012", Without English Translation, 19 pgs.
"Japanese Application Serial No. 2010-185225—Office Action Received", 6 pgs.
"Japanese Application Serial No. 2012-037961, Office Action mailed Jun. 26, 2012", 6 pgs.
Storey, J R, et al., "A Description of the Broadcast Telidon System", IEEE Transactions on Consumer Electronics, vol. CE-26, (Aug. 1980), 9 pgs.
"U.S. Appl. No. 09/903,448, Response filed Jun. 13, 2012 to Non Final Office Action mailed Jan. 6, 2012", 14 pgs.
"Chinese Application Serial No. 031029655, Notice of Allowance mailed Dec. 15, 2006", with English translation, 4 pgs.
"Chinese Application Serial No. 200610101903.4, Voluntary Amendment filed Oct. 31, 2008", with English translation of claims, 20 pgs.
"European Application Serial No. 03002720.5, Datasheet for the decision mailed Jan. 27, 2011", 23 pgs.
"European Application Serial No. 03002720.5, Notice of Opposition mailed Jul. 27, 2011", 6 pgs.
"European Application Serial No. 03002720.5, Office Action mailed Oct. 26, 2010", 34 pgs.
"European Application Serial No. 03002723.9, Notice of Opposition mailed Aug. 31, 2011", 6 pgs.
"European Application Serial No. 95105803.1, Notice of Allowance mailed Mar. 30, 2004", 6 pgs.
"European Application Serial No. 95105803.1, Office Action mailed Oct. 29, 2003", 6 pgs.
"Japanese Application Serial No. 98882/1995, Office Action mailed May 16, 2008", with English translation of claims, 7 pgs.
"Thailand Application Serial No. 024080, Notice of Allowance mailed Feb. 6, 2006", 6 pgs.
"Japanese Application Serial No. 2012-037961, Response filed Oct. 25, 2012 to Office Action mailed Jun. 26, 2012", with English translation of claims, 13 pgs.
"U.S. Appl. No. 09/672,523, Examiner Interview Summary mailed Dec. 5, 2012", 3 pgs.

(56) References Cited

OTHER PUBLICATIONS

"Chinese Application Serial No. 200610093448.8, Response filed Dec. 24, 2012 to Office Action mailed Oct. 8, 2012", with English translation of claims, 6 pgs.
"U.S. Appl. No. 09/672,523, Examiner Interview Summary mailed Apr. 12, 2013", 3 pgs.
"U.S. Appl. No. 09/672,523, Supplemental Amendment filed Mar. 28, 2013", 4 pgs.
"U.S. Appl. No. 09/672,523, Supplemental Amendment filed Apr. 5, 2013", 3 pgs.
"U.S. Appl. No. 09/903,448, Examiner Interview Summary mailed May 23, 2013", 3 pgs.
"Chinese Application Serial No. 201220160793.X, Third Office Action mailed Mar. 27, 2013", with English translation of claims, 18 pgs.
"U.S. Appl. No. 09/672,523, Appeal Brief filed Nov. 17, 2010", 122 pgs.
"U.S. Appl. No. 09/672,523, Decision on Pre-Appeal Brief Request mailed Sep. 27, 2006", 2 pgs.
"U.S. Appl. No. 09/672,523, Decision on Pre-Appeal Brief Request mailed Oct. 26, 2009", 2 pgs.
"U.S. Appl. No. 09/672,523, Examiner's Answer to Appeal Brief mailed Jan. 12, 2011", 18 pgs.
"U.S. Appl. No. 09/672,523, Preliminary Amendment filed Oct. 6, 2000", 73 pgs.
"U.S. Appl. No. 09/903,091, Examiner Interview Summary mailed Feb. 15, 2007", 2 pgs.
"U.S. Appl. No. 09/903,091, Examiner Interview Summary mailed Nov. 10, 2010", 3 pgs.
"U.S. Appl. No. 09/903,091, Non Final Office Action mailed Feb. 2, 2011", 12 pgs.
"U.S. Appl. No. 09/903,091, Non-Final Office Action mailed Apr. 1, 2010", 15 pgs.
"U.S. Appl. No. 09/903,091, Response filed Sep. 1, 2010 to Non Final Office Action mailed Apr. 1, 2010", 16 pgs.
"U.S. Appl. No. 09/903,448, Examiner Interview Summary mailed Jun. 29, 2010", 3 pgs.
"U.S. Appl. No. 09/903,448, Final Office Action mailed Apr. 30, 2010", 23 pgs.
"U.S. Appl. No. 09/903,448, Non Final Office Action mailed Jan. 6, 2012", 12 pgs.
"U.S. Appl. No. 09/903,448, Non Final Office Action mailed Jun. 9, 2011", 9 pgs.
"U.S. Appl. No. 09/903,448, Response filed Jul. 30, 2010 to Final Office Action mailed Apr. 30, 2010", 24 pgs.
"U.S. Appl. No. 09/903,448, Response filed Oct. 11, 2011 to Non Final Office Action mailed Jun. 9, 2011", 16 pgs.
"Chinese Application Serial No. 200610101903.4, Response filed Apr. 15, 2011 to Office Action mailed Feb. 1, 2011", 11pgs.
"European Application Serial No. 03002720.5, Summons to Attend Oral Proceedings Received mailed Jun. 18, 2010", 9 pgs.
"European Application Serial No. 03002721.3, Office Action mailed Feb. 3, 2011", 6 pgs.
"Japanese Application Serial No. 2009-101935, Appeal Decision", 40 pgs.
"Japanese Application Serial No. 2009-101935, Final Office Action mailed Apr. 20, 2010", 4 Pgs.
"Japanese Application Serial No. 2010-185225, Final Office Action mailed Aug. 23, 2011", w/English Translation, 5 pgs.
"Japanese Application Serial No. 2010-185225, Office Action mailed Feb. 15, 2011", 8 pgs.
"Japanese Application Serial No. 98882/1995, Japanese Office Action mailed Jul. 5, 2005", 5 pgs.
"U.S. Appl. No. 09/672,523 Final Office Action mailed Jan. 6, 2009", 19 pgs.
"U.S. Appl. No. 09/903,091, Response filed Jan. 16, 2009 to Non-Final Office Action mailed Sep. 16, 2008", 14 pgs.
"U.S. Appl. No. 09/903,448, Response filed Jan. 5, 2009 to Final Office Action mailed Sep. 3, 2008", 29 pgs.
"U.S. Appl. No. 09/903,448, Preliminary Amendment mailed Jul. 10, 2001", 51 pgs.
"U.S. Appl. No. 09/903,458, Restriction Requirement mailed Feb. 4, 2009", 6 pgs.
"Basis of Digital Technology in Broadcasting (9th), Service Image of ISDB & Supportive Basis Technology". *Toru Kuroda, NHK Technical Research Laboratory Report, No. 45,* NHK Science & Technical Research Laboratories, (Oct. 1, 1993). 10-45.
"Japanese Application Serial No. 98882/1995, Office Action mailed Nov. 18, 2008", 23 pgs.

* cited by examiner

APPARATUS FOR TRANSMITTING AND RECEIVING EXECUTABLE APPLICATIONS AS FOR A MULTIMEDIA SYSTEM, AND METHOD AND SYSTEM TO ORDER AN ITEM USING A DISTRIBUTED COMPUTING SYSTEM

Matter enclosed in heavy brackets [ ] appears in the original patent but forms no part of this reissue specification; matter printed in italics indicates the additions made by reissue.

*RELATED APPLICATIONS*

*This application is a reissue divisional of application Ser. No. 09/672,523, which is an application for reissue of U.S. Pat. No. 5,819,034.*

*The following other related reissue divisional applications of application Ser. No. 09/672,523 for reissue of U.S. Pat. No. 5,819,034 are:*

*Ser. No. 09/903,448 filed on Jul. 10, 2001, which is pending, is a division of and claims the benefit of Ser. No. 09/672,523;*

*Ser. No. 09/903,458 filed on Jul. 10, 2001, which is pending, is a division of and claims the benefit of Ser. No. 09/672,523;*

*Ser. No. 09/903,091 filed on Jul. 10, 2001, which is Abandoned, is a division of and claims the benefit of Ser. No. 09/672,523.*

The present invention relates to a client-server distributed computer system. Such a computer system has application in broadcast multimedia applications.

Early computer systems were standalone systems, consisting generally of mainframe computers. Later, several mainframe computer systems were closely connected, or clustered, to handle larger computing jobs, such as a large number of time sharing users. With the advent of personal computers, large numbers of relatively low power standalone computer systems were controlled directly by their users. Soon these large numbers of personal computers were coupled together into networks of computers, providing shared resources and communications capabilities to the users of the individual personal computers and between those users and the preexisting mainframe computers.

One form of such a network includes a central computer, called a server, which generally includes a large amount of mass storage. Programs used by the network users are centrally stored in the mass storage on the server. When a user desires to run a program, the user's computer requests that a copy of that program be sent to it from the server. In response to that request, the server transfers a copy of the program from its mass storage to the main memory of the personal computer of that user, and the program executes on that personal computer. Data also may be centrally stored in the server and shared by all the users on the network. The data is stored on the mass storage of the server, and is accessible by all the network users in response to a request. The server also serves as a hub for communications of messages (electronic mail) between network users The server in such a system handles the storage and distribution of the programs, data and messages, but does not contribute any processing power to the actual computing tasks of any of the users. I.e. a user cannot expect the server computer to perform any of the processing tasks of the program executing on the personal computer. While such networks perform a valuable function, they are not distributed computing systems, in which interconnected computers cooperate to perform a single computing task.

In an improvement to such networks, the network may be configured in such a manner that a user on the network may request that the server, or other personal computer connected to the network, execute a program. This is termed remote execution because a computer (server or other personal computer) remote from the requester is executing a program in response to a request from the requester. In such a system, the program of which remote execution is requested is either sent from the requester to the remote computer, or retrieved from the server in response to a request by the remote computer. When the program is received, it is executed. In this manner several computers may be enlisted to cooperate in performing a computing function.

Recently, there have been programs which distribute the actual computing tasks necessary for performing a single computing function. For example, in such a data base program, where the data base is stored in the mass storage of the server, if a user desires to make a query of the data base, the portion of the data base management program on that user's personal computer will generate a query request, which is forwarded to the server. The portion of the data base management program on the server performs the query processing, e.g. parsing the query request, locating where the data specified in the query request resides on its mass storage device, accessing that data, and sending the results back to the requesting personal computer over the network. The portion of the data base management program on the personal computer then processes the data received from the server, e.g. formatting it, and displaying it on the screen or printing it on a printer. While the server is processing the query request, the personal computer is free to perform other processing, and while the personal computer is generating the query request, and processing the resulting data received from the server, the server is free to process query requests from other personal computers.

Other types of programs are also amenable to this type of distributed computing, termed client-server computing. The sharing of the processing tasks between the personal computer and the server improves the overall efficiency of computing across the network. Such client-server computer systems, and remote execution networks, may be termed distributed computing systems because several computers (the server and/or the respective peripheral computers) cooperate to perform the computing function, e.g. data base management.

Recently, broadcast multimedia programs, more specifically, interactive television (TV) programs, have been proposed. Interactive TV programs will allow a viewer of a television program to interact with that program. In an interactive TV system, the central broadcast location (TV network, local TV studio, cable system, etc.) will have a central computer, corresponding to the server computer, which will produce signals related to the interactive TV program to be broadcast simultaneously with the TV (video and audio) signals. These signals carry data representing the interactive TV program and may include commands, executable program code and/or data for controlling the viewer interaction. Each viewer location will have a computer, corresponding to the client computer, which will receive the commands, executable code and/or data from the central computer, execute the executable code, process the received data, accept input from the user and provide data to the user by means of the TV screen. The input from the user may be sent back to the computer at the broadcast location, allowing the user to interact with the interactive TV program.

U.S. Pat. No. 4,965,825, SIGNAL PROCESSING APPARATUS AND METHODS, issued Oct. 23, 1990 to Harvey et al., describes an interactive TV system in which a central broadcast location includes signals carrying commands, executable code and data in, for example, the vertical blanking interval of the television signal for receipt by the computer systems at the viewer locations. A computer at the viewer location extracts the commands, executable code and data and executes the code to process the data and interact with the user. Such a system is comparable to the remote execution function of distributed computer systems, described above, in that the viewer computer is enlisted into the interactive TV program, and is controlled by the central location.

In all of the above systems, a central computer controls or responds to requests from peripheral computers attached to it through a network. I.e. the peripheral computer (personal computer) requests remote execution of a program, requests a file or message from, or sends a query request to, another computer. Only in response to a request does the other computer provide a response, e.g. remote execution, the requested file, message or retrieved data. In addition, in general, the peripheral computer is required to have all the resources necessary to completely, or almost completely, execute the desired program, with the server acting only as another storage mechanism or at most sharing a portion of the computing tasks.

The inventors propose a distributed computing system in which a server computer continuously produces a data stream. This data stream acts a mass storage device for the client computers receiving it. This data stream repetitively includes data representing a distributed computing application in which the client computer may participate, including executable code and data. A transport mechanism, including a high speed, one-way, communication path, carries the data stream from the server to the client. The client receives the data stream, extracts the distributed computing representative data and executes the distributed computing application.

In accordance with principles of the present invention, a distributed computer system comprises a source of a continuous data stream repetitively including data representing a distributed computing application and a client computer, receiving the data stream, for extracting the distributed computing application representative data from the data stream, and executing the extracted distributed computing application.

In a distributed computing system according to the invention, the client computer system need not include all the resources, in particular, main memory and mass storage, necessary to perform the entire program. Instead, no mass storage is required because the data stream provides the function of the mass storage device, and the main memory requirement is modest because only the currently executing portion of the program need be stored in memory. When the currently executing portion has completed, its memory space is freed up, and the next executing portion is extracted from the data stream, stored in the freed memory space, and that portion begins execution.

In addition, a distributed computing system according to the present invention allows the user of the client computer to have the option participating in the distributed computing task. If it is desired to participate, the client computer extracts the data representing the distributed computing application and executes the distributed computing application, as described above. If it is desired not to participate, the data stream is merely ignored, and the processing desired by the user, or none at all, is performed. Such a distributed computing system also allows each participating client computer to join the distributed computing function at any time and to proceed at its own pace in performing its own computing function.

A distributed computing system according to the present invention is particularly amenable to interactive TV applications because it allows a viewer to tune into an interactive TV channel at any time, join in the interactivity whenever desired (or not at all), and allows all the viewers to proceed at their different paces. This is especially advantageous in an so environment when an interactive commercial, with its own executable code and data, may be presented within an interactive program, or when the viewer wishes to change channels.

Figure 1:
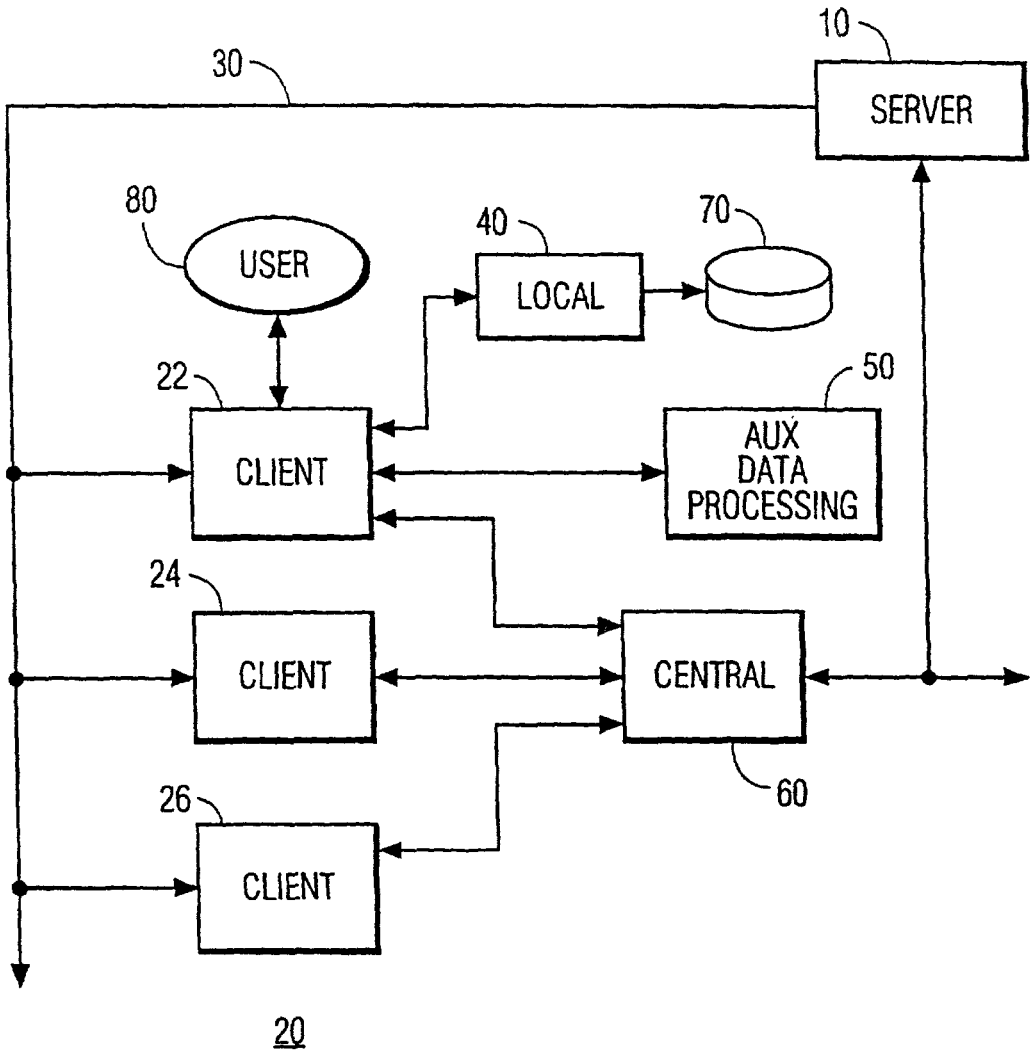
FIG. 1 is a block diagram of a distributed computing system according to the present invention.

FIG. 1 is a block diagram of a distributed computing system according to the present invention. In FIG. 1, a server computer 10, which may include a large computer system, is coupled to a plurality of client computers 20 through a transport mechanism 30. The server computer 10 may be coupled to more than the three client computers 20 illustrated in FIG. 1, and the client computers 20 may be geographically widely dispersed. Client: computer 22 is bidirectionally coupled to a local computer 40, to an auxiliary data processing system 50 and to a central processing facility 60. The central processing facility 60 is bidirectionally coupled to the server computer 10. The central processing facility 60 may also be connected to facilities other than the server computer 10 illustrated in FIG. 1. The local computer 40 is further bidirectionally coupled to a mass storage device 70. The client computer 22 interacts with a user 80 by providing information to the user via a display screen or other output device (not shown) and by accepting information from the user via a keyboard or other input device (also not shown).

Client computers 24 and 26 also interact with their users, (not shown in order to simplify the drawing). In addition, client computers 24 and 26 are bidirectionally coupled to the central processing facility 60. Such links are optional, however. The only requirements for any client computer 20 is a way to interact with a user, and a connection to the transport mechanism 30. Links to local computers, auxiliary data processing systems, and the central processing facility 60 are all optional, and need not be present in every one of the client computers 20.

The transport mechanism 30 includes a unidirectional high speed digital data link, such as a direct fiber optic or digital satellite link from the server 10 to the client computers 20. The data may be transported over the transport system 30 by a packet data system. In such a system, a stream of data packets, each including identification information indicating, among other things, the type of data contained in that packet and the actual data, is transmitted through the data link. Such a packet data system allows several independent streams of data, each identified by identification information in their packets, to be time multiplexed within a single stream of packets.

In addition, it is possible to multiplex a plurality of such packet data streams over respective channels on the same physical medium (fiber optic or satellite radio link) making up the transport mechanism 30. For example, different data streams may be modulated on carrier signals having different frequencies. These modulated carriers may be transmitted via respective transponders on a satellite link, for example. Further, if a particular transponder has sufficient capacity, it is possible to time multiplex several data streams on a single modulated carrier.

The client computers 20 each contain a data receiver for selecting one of the streams of packets being transported over the transport mechanism 30, receiving the selected stream of packets and extracting the data contained in them. Continuing the above example, the data receiver may include a tunable demodulator for receiving one of the respective modulated carriers from the satellite link. In addition, the data receiver may include circuitry for time demultiplexing the respective data streams being carried by that modulated carrier.

In operation, the server 10 produces a continuous data stream in the form of a stream of packets for the client computers 20. The server 10 repetitively inserts a packet, or successive packets, containing data representing the distributed computing application, including at least one executable code module, into the data stream. This code module contains executable code for the client computers 20. The data receiver in, for example, client computer 22, continuously monitors the packets in the data stream on transport mechanism 30. When a packet including identification information indicating that it contains the code module (or a portion of the code module) required by the client computer 22 is present in the data stream, the client computer 22 detects its presence, extracts the code module (or the portion of the code module) from that packet and stores it in the main memory. When the code module is completely received, the client computer 22 begins to execute it.

There may be more than one code module placed in the continuous data stream, each containing a different portion of the distributed computing application. For example, it is possible to divide the distributed computing application into small portions in such a manner that only one portion at a time need be executed at a time. The portion of the distributed computing application currently needed to execute is loaded into the memory of the client computer 22. When that portion has completed its execution, then a code module containing the executable code for the next portion of the distributed computing application is extracted from the data stream, stored in memory and executed. Each portion is extracted from the data stream as needed. If there is sufficient memory in the client computer 22, it is possible to load several code modules into the memory and switch between them, without extracting them from the data flow, but this is not necessary. By structuring a distributed computing application in this manner, the required memory size of the client computer 22 may be minimized.

The server 10 may also repetitively include a packet or packets containing one or more data modules in the data stream. The data modules contain data to be processed by the executable code in the code module. Prior to, or during the execution of the code from a previously extracted code module, the client computer 22 may require access to the data in the data module or modules. If so, the client computer 22 monitors the data stream for the required data module or modules. When packets containing the data module or modules (or portions of the data module or modules) are present in the data stream, they are extracted, and the contents stored in the main memory of the client computer 22. When all the required data modules have been completely received, the client computer 22 begins or continues execution of the code from the code module to process the data from the received data module or modules. As is the case for code modules, it is possible for more than one data module to be stored in memory, if there is sufficient memory in client computer 22.

The server 10 may further repetitively include in the data stream a packet or packets containing a directory of the code and data modules currently being included in the data stream. The directory includes a list of all the code and data modules which are present in the data stream, along with information about those modules. If a directory is present in the data stream, then, prior to extraction of any code or data modules from the data stream, the client computer 22 monitors the data stream for the directory. When packets containing the directory (or portions of the directory) are present in the data stream, they are extracted, and their data stored in the main memory of the client computer 22. When the directory has been completely received, the client computer 22 evaluates the entries in the directory, then requests the first code and/or data module from the data stream and execution proceeds as described above.

Any of the client computers 20 may join the distributed computing function represented by the packet stream at any time, and each of the client computers 20 may operate at its own speed, generally in response to the user 80. In order to allow for this, the server 10 repetitively places the directory and all the code and data modules which the client computers 20 may require to perform their portion of the distributed computing function into the data stream on the transport mechanism 30. Whenever one of the client computers 20 joins the distributed computing function, it monitors the newly selected packet stream on the transport mechanism 30 for the directory module, extracts it, and processes it as described above. During execution, whenever one of the client computers 20 requires the a new code and/or data module, it monitors the data stream on the transport mechanism 30 for the newly required code and/or data module, extracts it and either executes it, if it is a code module, or processes it if it is a data module, as described above.

The packet data stream may also include packets of auxiliary data. This data is not required by the client computer 22 for execution of the code, although it may be related to the execution because the user 80 may interact with the executing program on the client computer 22 based on received auxiliary data. The data stream receiver in the client computer 22 recognizes the auxiliary data packets in the data stream on the transport mechanism 30 and passes them directly to the auxiliary data processor 50. The auxiliary data processor 50 processes its packets independently of the client computer 22. If the auxiliary data must be presented to the user 80, the auxiliary data processor 50 may provide its own display device (not shown) which may be shared with the client computer 22, or the display device (not shown) associated with the client computer 22 may be shared with the auxiliary data processor 50, to provide a single information display to the user 80. The auxiliary data processor 50 may have links to other illustrated elements in (not shown), but that is dependent upon the type of data.

In an interactive TV system, for example, the auxiliary data includes the video and audio portions of the underlying television signal. For example, the auxiliary data would include video packets containing MPEG, or MPEG-like, encoded data representing the television image and audio packets containing digitally encoded audio. Further, there may possibly be several different audio packet streams carrying respective audio channels for stereo, second audio program (SAP) or multilanguage capability. In an auxiliary data processor 50 in such a system, the video packets would be supplied to a known MPEG (or similar) decoder (not shown) which would generate standard video signals, which would be supplied to a television receiver or video monitor (not shown). The audio packets would be supplied to a known audio decoder (not shown) which would generate standard audio signals for the television receiver or speakers (not shown).

In such an interactive TV system, the client computer 22 may, in response to execution of the executable code module, generate graphic displays to supply information to the user 80. These graphic displays may be combined with the standard video signal from the MPEG decoder in a known manner, and the combined image displayed on the television receiver or video monitor. The client computer 22 may also generate sounds to provide other information to the viewer. The generated sounds may be combined, in known manner, with the standard audio signals from the audio decoder, and the combined sound played through the television receiver or speakers.

Furthermore, time code data may be included in either or both of the television auxiliary packet data stream and the packet data stream representing the interactive TV application. This permits synchronization of any graphic images or sounds generated by the client computer 22 with the television signal from the auxiliary data. In this case, the client computer 22 would have access to the time code data, and would control the generation of the graphic image and/or sound to occur at the desired time, as supplied by the time code data.

In such an interactive TV system, both the client computer 22 and the auxiliary data processor 50 may be contained in a single enclosure, such as a television receiver, or television set-top decoder box. A television receiver, or decoder box would include connectors for attaching to a local computer or other equipment.

The user 80 provides input to the program running on the client computer 22 during its execution. This data may be required by the server 10 in order to effect the distributed computing function. In an interactive TV system, for example, user 80 may provide input to the client computer through a handheld remote control unit.

The user data is transferred to the server computer 10 via the central processing facility 60. In one embodiment, data is sent from the client computers 20 to the server computer 10 via modems through the telephone system acting as the central processing facility 60. The server computer 10 receives and processes the data received from the client computers 20 during execution of its portion of the distributed computing function.

Server computer 10 may generate new, or modify existing, code and/or data modules in the data stream on the transport mechanism 30, in a manner described below, based on that received data. Alternatively, the server computer 10 may immediately return information to the client computers 20 in the other direction through the central processing facility 60. The information in newly generated code and/or data modules is processed by all client computers 20 participating in the distributed computing function, while information passed from the server computer 10 to the client computers 20 through the central processing facility 60 is specifically related to the client computer (22, 24, 26) to which that information was sent.

In another embodiment, the central processing facility 60 may include its own computer system, separately connected by modem to both the client computers 20 and the server computer 10 through the telephone system. In either of the above embodiments, the central computing facility 60 provides access to other computers or processing facilities (not shown) via the telephone system. Thus, if information from other computer systems is needed to perform the distributed computing function, those computer systems may be accessed via modem through the telephone system by either the client computers 20 or the server computer 10.

An input/output (I/O) port on the client computer 22 is coupled to a corresponding port on the local computer 40. Local computer 40 is collocated with the client computer 22. Local computer 40 may be a personal computer used by the user 80 of the client computer 22, or may be a larger computer, or computer network located at the same site as the client computer 22. This allows the client computer 22 to access data on the attached mass storage 70 of the personal computer or a computer on the network located at the client computer 22 site. In addition, the client computer 22 may use the mass storage 70 of the local computer 40 for storage of data to be retrieved later. It is likely that the local computer 40 will include both an output device (not shown) such as a computer monitor and an input device (also not shown) such as a computer keyboard. Both of these may be shared with the client computer 22 and/or the auxiliary data processor 50, as described above.

For example, the distributed computing system illustrated in may be part of a widespread corporate computing system, and the server 10 may be located at a central location of that corporation. The client computer 22 may be located a remote location, and the local computer 40 may be coupled to the personal computer network at that location. Workers at that location may store shared data (e.g. financial information) on the server connected to that network. The distributed computing function may include gathering local financial data from the client computers at the remote locations, processing that financial data and returning overall financial results to the client computers. In such an application, the executable code executing on the client computer 22 accesses the data from the local computer 40 (either from its attached mass storage 70 or through the network) through the I/O port, and sends it to the server computer 10 through the central processing facility 60. The server computer 10 continues its processing based on the information received from client computer 22 (and other client computers 20), and returns the results of that processing to the client computers 20 either through the central processing facility 60 or via the data stream on the transport mechanism 30.

In another example, the distributed computing system may be an interactive television system, broadcasting a home shopping show as the distributed computing application. In such a case, the auxiliary data carries the video and audio portion of the television signal, which may show and describe the items being offered for sale, and may include both live actors and overlaid graphics generated at the central studio. Code and data modules making up the interactive television application may include data about the products which will be offered for sale during this show, or portion of the show, and executable code to interact with the user in the manner described below.

When a viewer wishes to order an item, a button is pressed on the TV remote control. This button signals the client computer 22 to display a series of instructions and menus necessary to solicit the information necessary to place the order, e.g. the item number, name and address of the viewer, the method of payment, the credit card number (if needed), etc. These instructions are generated in the client computer as graphics which are overlaid on the television video image. It is also possible for a computer generated voice to be generated and combined with the television audio either by voice-over, or by replacing the television audio. The viewer responds to the instruction by providing the requested information via the TV remote control. When the information requested by the on-screen display and/or voice instructions has been entered by the viewer, it is sent to a central computer via the modem in the client computer. An order confirmation may be sent in the other direction from the central computer.

It is also possible that permanent information about the viewer (i.e. the name, address, method of payment and credit card number) may be preentered once by the viewer, so it is not necessary to solicit that information each time an order is placed. The information is stored in permanent memory in the client computer. In such a case, when an order is placed, that information is retrieved from the permanent memory, appended to the item number and transmitted to the central computer. It is further possible that, by means of time codes, or other commands, inserted into the data stream, the client computer will know which item is currently being offered for sale. In such a case, the viewer will be able to order it by simply pressing one button on the TV remote control. In response, the client computer can combine the previously received information related to the item currently being offered for sale with the previously stored personal information related to the viewer, and transmit the order to the central computer and receive the confirmation in return.

Because the code and data modules related to the home shopping program are repetitively inserted into the data stream, a viewer may tune into the program at any time and be able to participate interactively. Similarly, it is not necessary for the viewer to participate interactively, but may simply ignore the interactive portion of the show.

It is also possible for the client computer 22 to receive control information from the local computer 40. For example, the user 80, using the local computer 40, could control the client computer 22 via the I/O port to select a desired one of the data streams on transport mechanism 30, and process the program currently being broadcast on that data stream, with interaction with the user 80 through the input and output devices (not shown) connected to the local computer 40.

It is further possible for the user 80 to cause the client computer 22 to access the server computer 10 through the central processing facility 60, instead of via the data stream on transport mechanism 30, and receive code and data modules via this bidirectional link.

Figure 2:
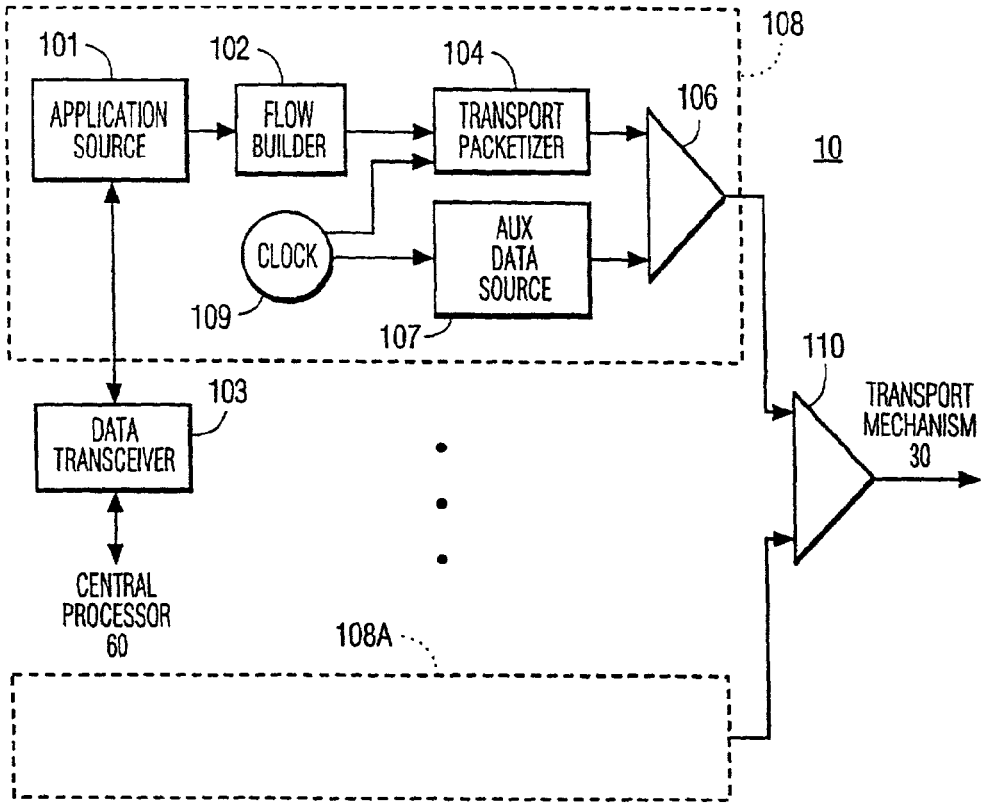
FIG. 2 is a block diagram of a server computer as illustrated in FIG. 1.

FIG. 2 is a block diagram illustrating a server computer 10 as illustrated in FIG. 1. In FIG. 2, a source of distributed computing application code and data 101 includes an application compiler, and software management module (not shown) and has an output terminal coupled to an input terminal of a flow builder 102. An output terminal of flow builder 102 is coupled to an input terminal of a transport packetizer 104. An output terminal of transport packetizer 104 is coupled to a first input terminal of a packet multiplexer 106. An output terminal of packet multiplexer 106 is coupled to an input terminal of a transport multiplexer 110. An output terminal of transport multiplexer 10 is coupled to the physical medium making up the transport mechanism 30 (of FIG. 1) A second input terminal of packet multiplexer 106 is coupled to a source of auxiliary data packets 107. A clock 109 has respective output terminals coupled to corresponding input terminals of the transport packetizer 104 and auxiliary data source 107. A data transceiver 103 has an first bidirectional terminal coupled to the central processing facility 60 (of FIG. 1) and a second bidirectional data coupled to the application code and data source 101. Application code and data source 101, flow builder 102, transport packetizer 104, auxiliary data source 107, clock 109 and packet multiplexer 106, in combination, form a channel source 108 for the transport mechanism, illustrated by a dashed box in. Other channel sources, including similar components as those illustrated in channel source 108 but not shown in FIG. 1, are represented by another dashed box 108a. The other channel sources (108a) have output terminals coupled to other input terminals of the transport multiplexer 110, and may have input terminals coupled to central processing facilities through data transceivers.

In operation, data representing the distributed computing application program, and data related to the transmission of the program over the transport mechanism 30 are supplied to the flow builder 102 from the application source 101. This data may be supplied either in the form of files containing data representing the code and data modules, or by scripts providing information on how to construct the code and data modules, or other such information. The code and data modules may be constant or may change dynamically, based on inputs received from the client computers 20 via the central computing facility 60 and/or other sources. The executable code and data module files may be generated by a compiler, interpreter or assembler in a known manner in response to source language programming by an application programmer. The data file related to the transmission of the modules includes such information as: the desired repetition rates for the directory and the code and data modules to be included in the data stream; the size of main memory in the client computers 20 required to store each module, and to completely execute the application program; a priority level for the module, if it is a code module, etc.

Flow builder 102 processes the data from the application source 101. In response, flow builder 102 constructs a directory module, giving an overall picture of the application program. The information in the directory module includes e.g. the identification of all the code and data modules being repetitively transmitted in the data stream, their size and possibly other information related to those modules. Then the application program representative data is processed to generate the code and data modules. The directory, code and data modules thus constructed are formatted by adding module headers and error detection and/or correction codes to each module. A transmission schedule is also generated. After this processing is complete, the data representing the directory module and the code and data modules are repetitively presented to the transport packetizer 104 according to the schedule previously generated.

The transport packetizer 104 generates a stream of packets representing the directory module and the code and data modules as they are emitted from the flow builder 102. Each packet has a constant predetermined length, and is generated by dividing the data stream from the flow builder into groups of bits, and adding a packet header with information identifying the information contained in the packet, and an error detection and/or correction code, etc., to each group, such that each packet is the same predetermined length. (If there is insufficient data from the flow builder 102 to completely fill a packet, the packet is padded with null data.) These packets are time multiplexed with the auxiliary data packets, in a known manner, to form a single packet stream in the packet multiplexer 106. It is also possible for the generated packets to have varying lengths. In this case, the packet header for each packet will contain the length of that packet. In addition, time code data packets are placed in the data stream packets and/or the auxiliary data packets based on data received from the clock 109.

Packet streams from all of the channel sources (108, 108a) are multiplexed into a single transport channel, which is transmitted through transport mechanism 30. As described above, the packet streams may be frequency multiplexed by having each packet stream modulate a carrier signal at a different frequency, with all of the carriers being carried by a satellite link to the client computers 20, in a known manner. In addition, if there is sufficient capacity within one carrier channel several packet streams may be statistically time multiplexed, and used to modulate a single carrier, also in a known manner. For example, it has been proposed to time multiples up to eight interactive television data streams through a single satellite link.

Data from the client computers 20 via the central processing facility 60 (of FIG. 1) is received at the server computer 10 by the data transceiver 103, which may include its own processor (not shown). If an immediate response is generated, the transceiver 103 processor returns that response via the central processing facility 60 to a specific client computer (22-26), a specific set of the client computers 20 or to all client computers 20 in their turn. If, however, a common response to all client computers 20 is desired, the application programmer may amend the code and data files in the application code and data source 101 using the application compiler. These amended files are then processed by the flow builder again to generate another flow. It is further possible that the code and data files in the application source 101 may be amended automatically and dynamically (i.e. in real time) in response to data received from the transceiver 103, and the flow updated as the data is being received from the client computers 20.

Figure 3:
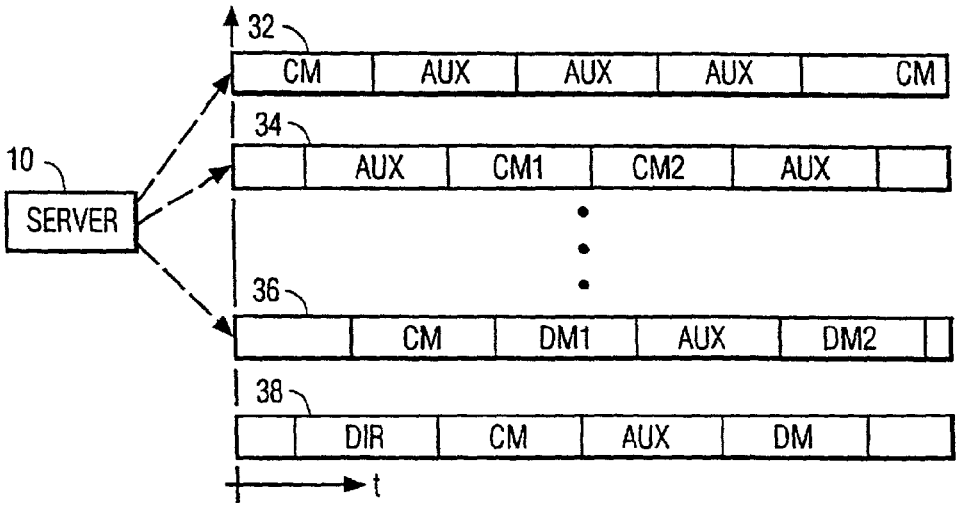
FIG. 3 is a timing diagram illustrating the data streams produced by a server computer in a distributed computing system as illustrated in FIG. 1.

FIG. 3 is a timing diagram illustrating the data streams produced by the server computer 10 in a distributed computing system as illustrated in FIG. 1. In FIG. 3 server computer 10 is shown as simultaneously producing a plurality of packet streams 32-38. Each packet stream (32-38) is shown as a horizontal band divided into packets having the same duration and number of bits. As described above, it is possible that the size of the packets within any packet stream vary with the amount of data to be carried. In FIG. 3 it can be seen that the starting times of the packets are not synchronized. It is possible to synchronize the packets, but it in not necessary. In FIG. 3, packets carrying data representing directories are designated DIR, packets carrying data representing code modules are designated CM, packets carrying data representing data modules are designated DM, and packets carrying auxiliary data are designated AUX.

In the top series of packets 32, the leftmost packet contains data representing a code module, CM. This is followed by three packets containing auxiliary data, AUX, followed by another packet containing data representing the code module, CM. From the series of packets 32 it can be seen that the code module is repetitively produced. There may be more or fewer packets in between successive repetitions of the code module packets CM. The rate of repetition may be specified by the programmer when the application is programmed, and may be varied during the execution of the application.

In the next series of packets 34, the leftmost packet contains auxiliary data, AUX. The next two packets contain respective portions of a code module (CM1,CM2). The last packet contains auxiliary data, AUX. From the series of packets 34 it can be seen that if a code module is too large to be contained in a single packet, it may be carried by more than one, with each packet containing a portion of the code module. Although two packets are illustrated in the series of packets 34 as containing the code module (CM1,CM2), any number of packets may be used to carry the code module, depending upon its size. The two packets carrying the code module, (CM1,CM2) are repetitively transmitted (not shown) in the series of packets 34, as described above.

In the series of packets 36, the leftmost packet contains data representing a code module (CM). The next packet (DM1) is a first packet containing data representing a data so module. The next packet contains auxiliary data, AUX. The next packet (DM2) is a second packet containing the remaining data representing the data module. From the series of packets 36 it may be seen that a data module (DM1,DM2), associated with the code module (CM), may also be included in the packet stream. Both the code module (CM) and the data module (DM1,DM2) are repetitively transmitted (not shown) in the series of packets 36. The rate of repetition of the code module (CM) may be different from that of the data module (DM1,DM2), and both rates may be specified by the application programmer and varied during the execution of the application.

It may further be seen that if the data module is too large to be contained in a single packet, it may be carried by more than one packet, with each packet containing a portion of the data module. Although two packets are illustrated in the series of packets 36 as containing the data module (DM1, DM2), any number of packets may be used to carry the data module, depending upon its size. It may be further seen that the packets carrying the data module need not be transmitted sequentially, but may have intervening packets in the packet stream. The same is true for multiple packets carrying a code module or directory module (not shown).

In the bottommost series of packets 38, the leftmost packet contains data representing the directory (DIR). The next packet contains data representing a code module (CM), followed by a packet containing auxiliary data (AUX) and a packet containing data representing a data module (DM). In the series of packet 38 all of a directory module (DIR), a code module (CM) and a data module (DM) in a single packet stream may be seen. The respective repetition rates of these three modules may be different, as specified by the programmer of the application, and may be varied during the execution of the application.

Figure 4:
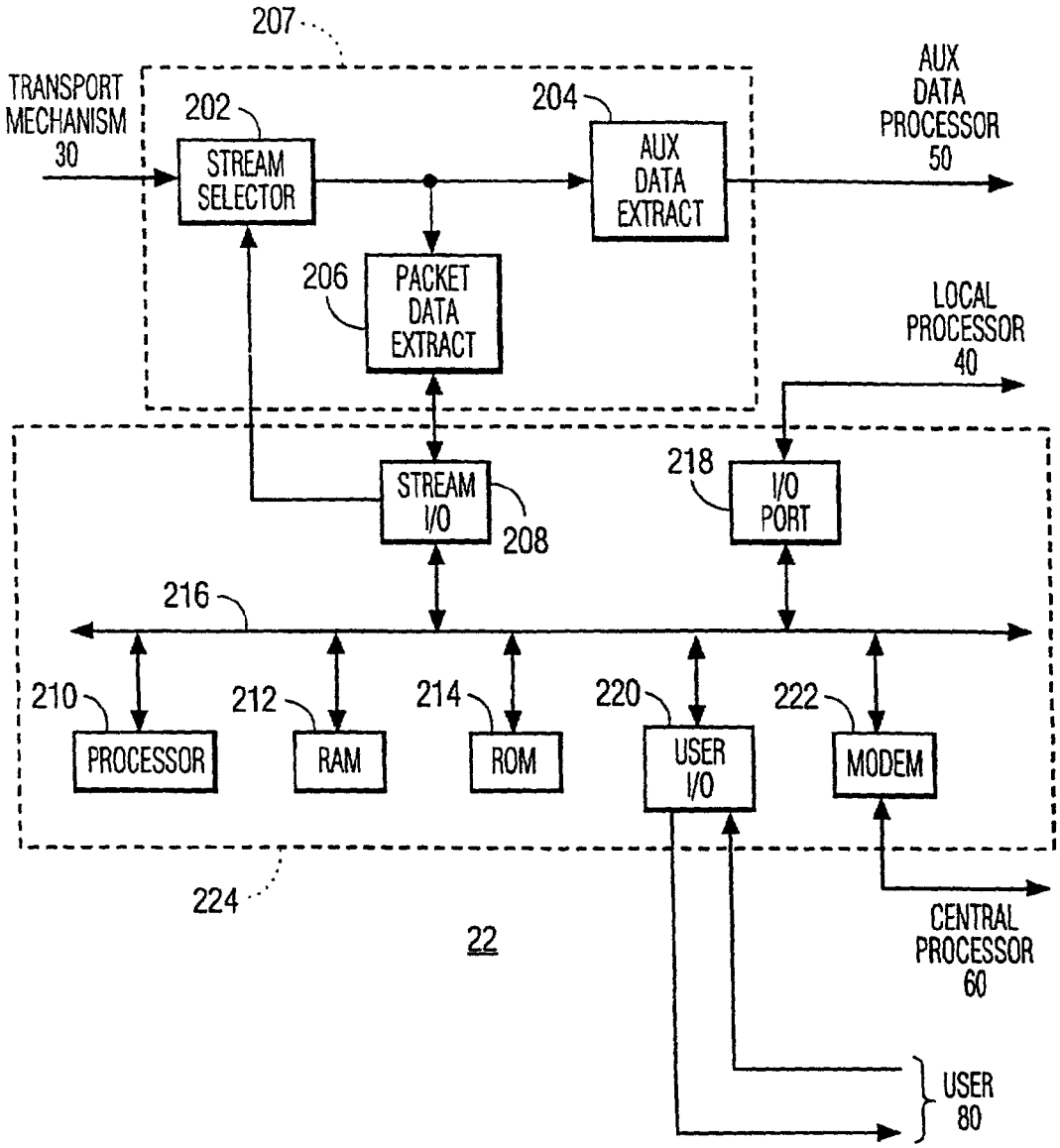
FIG. 4 is a block diagram of a client computer as illustrated in FIG. 1.

FIG. 4 is a block diagram of a client computer 22 as illustrated in FIG. 1. In FIG. 4, transport mechanism 30 (of FIG. 1) is coupled to an input terminal of a stream selector 202. An output terminal of stream selector 202 is coupled to respective input terminals of an auxiliary data extractor 204 and a packet data extractor 206. An output terminal of auxiliary data extractor 204 is coupled to the auxiliary data processor 50 (of FIG. 1). A bidirectional terminal of packet data extractor 206 is coupled to a corresponding terminal of a stream I/O adapter 208. A control output terminal of stream I/O adapter 208 is coupled to a corresponding control input terminal of stream selector 202. The combination of stream selector 202, auxiliary data extractor 204 and packet data extractor 206 form a data stream receiver 207 for client computer 22, illustrated by a dashed line in FIG. 4.

Stream I/O adapter 208 forms a part of a processing unit 224 in client computer 22, illustrated by a dashed line in FIG. 4. In addition to the stream I/O adapter 208, processing unit 224 includes a processor 210, read/write memory (RAM) 212 and read-only memory (ROM) 214 coupled together in a known manner via a system bus 216. Further input and output facilities are provided by an I/O port 218, coupled to the local processor 40 (of FIG. 1); user I/O adapter 220, for communicating with user 80; and modem 222, coupled to the central processing facility 60 (of FIG. 1); all also coupled to the system bus 216 in a known manner. Other adapters (not shown) may be coupled to system bus 216 to provide other capabilities to the processing unit 224.

As described above, auxiliary data extractor 204, I/O port 218 and modem 222 are not required in a client computer 20 according to the present invention. They are illustrated in FIG. 1 and FIG. 4 to show optional additional functionality.

In operation, processor 210 of processing unit 224 retrieves program instructions permanently stored in ROM 214, or temporarily stored in RAM 212, and executes the retrieved instructions to read data from ROM 212 and/or RAM 214, write data to RAM 212 and/or receive data from or supply data to outside sources via the I/O port 218, user I/O adapter 220 and/or modem 222, in a known manner. Under program control, processor 210 may also request a code and/or data module from the data stream supplied to the client computer 22 via the transport mechanism 30 (of FIG. 1). To retrieve this data, processor 210 first instructs stream I/O adapter 208 to send a selection control signal to the stream selector 202, possibly in response to user input from user I/O adapter 220. Then processor 210 issues a request for a specific code or data module to the stream I/O adapter 208. Stream I/O adapter 208 relays this request to the packet data extractor 204.

Transport mechanism 30 (of FIG. 1) supplies all of the plurality of packet: streams (32-38 of) it carries to the stream selector 202, which passes only the selected packet stream. Auxiliary data extractor 204 monitors the selected packet stream, extracts the auxiliary data packets from it and supplies them directly to the auxiliary data processor 50 (of FIG. 1). Packet data extractor 206 similarly monitors the selected packet stream, extracts the directory, code and/or data module packets requested by the stream I/O adapter 208 and supplies them to the stream I/O adapter 208. The data in the packets returned to the stream I/O adapter 208 is supplied to the RAM 212. When the entire module has been retrieved from the packet stream (which may require several packets, as described above), processor 210 is notified of its receipt by the stream I/O adapter 208. Processor 210 may then continue execution of its program.

The data stream in a distributed computing system illustrated in FIG. 1 is similar to a mass storage system in prior art systems. An application program executing on the processor 210 makes a request for a module listed in the directory in the same manner that such a program would make a request for a file containing a code or data module previously stored on a mass storage device in a prior art system. The data stream receiver 207 is similar to a mass storage device, and stream I/O 208 acts in a similar manner to a mass storage adapter on a prior art system by locating the desired data, transferring it to a predetermined location (I/O buffer) in the system memory and informing the processor of the completion of the retrieval. However, the stream I/O adapter 208 can only retrieve code and data from the data stream; data cannot be written to the data stream.

As described above, the distributed computing application may be divided into more than one code module, each containing executable code for a different portion of the distributed computing application. When a particular code module is desired, processor 210 requests that code module from stream I/O adapter 208. When execution of that module has completed, processor 210 requests the next module from stream I/O 208. Because code and data modules are repetitively carried on the data stream, a module may be deleted from RAM 212 when it is not currently needed without the necessity of temporarily being stored, because if it is required later, it may again be retrieved from the data stream when needed. However, if RAM 212 has sufficient capacity, processor 210 may request stream I/O adapter to simultaneously load several code modules into RAM 212. If this car, be done, then processor 210 may switch between code modules without waiting for stream I/O adapter 208 to extract them from the data stream.

As described above, other I/O adapters may be coupled to the system bus 216 in a known manner. For example, in an interactive TV system, a graphics adapter may be coupled to system bus 216. The graphics adapter generates signals representing graphical images, in a known manner, in response to instructions from the processor 210. Further, these signals may be combined with the standard video signal produced by the video decoder (described above) in the auxiliary data processor 50 of an interactive TV system. When the graphical image representative signal and the standard video signal are combined, the resulting signal represents an image in which the image generated by the graphics adapter is superimposed on the image represented by the broadcast video signal. It is also possible to selectively combine these two image representative signals under the control of the processor 210.

An interactive TV system, may also include a sound adapter coupled to the system bus 216. The sound adapter generates a signal representing a computer generated sound (such as music, synthesized voice or other sound), in a known manner, in response to instructions from the processor 210. Further, these signals may be combined with the standard audio signal produced by the audio decoder (described above) in the auxiliary data processor 50 of an interactive TV system. When the sound representative signal and the standard audio signal are combined, the resulting signal represents the combination of the sound generated by the sound adapter and the broadcast audio signal. It is also possible to selectively combine these two sound representative signals under the control of the processor 210.

The timing of the generation and display of the graphical image and sound representative signals, may be controlled by receipt of the time code data from the data stream. This enables an executable code module to synchronize the display of processor generated image and presentation of processor generated sound to the broadcast video and audio. It is further possible to synchronize the operation of the interactive TV application by the insertion of specialized packets into the data stream which cause an interrupt of the code currently executing in processor 210. Stream I/O 208 monitors the data stream for such specialized packets, and generates an interrupt, in a known manner, for the processor 210. Processor 210 responds to that interrupt, also in known manner, by executing an interrupt service routine (ISR). This ISR may be used for synchronization of the interactive TV application, or other purposes.

A client computer 22 in a distributed computing system as illustrated in FIG. 1 does not need a mass storage device, nor a large amount of RAM 212. Such a system decreases the cost of a client computer, and increases the functionality of the lower cost client computers. In addition, such a client computer has the option of participating in a distributed computing function, may join in the distributed computing function at any time (or may drop out and return later), and may participate at its own pace.

What is claimed is:

[1. A distributed computer system comprising:

a source of a data stream providing a series of time division multiplexed packets, ones of which contain auxiliary data that represent a video program, and others of which represent a distributed computing application associated with said video program, and wherein said distributed computing application is repetitively transmitted independent of receiving client computer apparatus during times that said video program is transmitted;

a client computer, which includes a packet selector connected to said source for selecting and directing packets containing said auxiliary data representing said video program to a video signal processor and selecting and directing packets containing said associated distributed computing application to a further processor, and said further processor including means to assemble said distributed computing application and execute said distributed computing application to form an interactive video program in which execution of said distributed computing application alters said video program.]

[2. The distributed computer system of claim 1 wherein said further processor includes a graphics adapter for creating graphical images and interactively combining said graphical images with said video program.]

[3. The distributed computer system of claim 1 wherein said video program is a television program and said further processor includes a graphics adapter for creating graphical images and interactively combining said graphical images with said television program.]

[4. The distributed computer system of claim 1 wherein said further processor includes a sound adapter for creating synthesized sound and interactively combining said synthesized sound with said video program.]

[5. The distributed computer system of claim 1 wherein said further processor includes memory for storing program controls and responsive thereto requests of said packet selector a code and/or data module from the data stream.]

[6. A distributed computer system comprising:

a source of a time division multiplexed packet signal including a plurality of distributed computing applications, each distributed computing application being repetitively transmitted independent of receiving client computer apparatus, and each of said distributed computing applications being in a form of a series of packets;

a first one of packets of a respective series containing data representing an executable code module and including identification information indicating that the first one of packets of said series contains data representing said executable code module;

a second one of packets of the series contains data representing a data module and includes identification information indicating that said second one of packets contains data representing the data module; and a third one of packets of the series contains auxiliary data and includes identification information indicating that the third one of packets contains auxiliary data;

a client computer including a data receiver for selecting packets of one of the plurality of distributed computing applications, and extracting the corresponding distributed computing application representative data included in the selected packets and applying it to computer program controlled apparatus for executing the extracted distributed computing application, said data receiver extracting auxiliary data from auxiliary packets in the data stream and supplying it to an auxiliary data processor.]

[7. A distributed computer system comprising:

a data stream source producing a data stream including a series of packets representing a plurality of time division multiplexed signals, one of said signals including data representing a distributed computing application, which distributed computing application is repetitively transmitted independent of receiving client computer apparatus, and at least one of the packets of the signal representing the distributed computing application includes a directory module containing information inter-relating packets associated with said distributed computing application;

a client computer, receiving the data stream, extracting the distributed computing application representative data from the data stream, and executing the extracted distributed computing application; and wherein the client computer extracts said directory module from the data stream and using data contained in the directory module extracts packets associated with said distributed computing application and builds said distributed computing application and executes said distributed computing application.]

[8. The computer system of claim 7, wherein:

a first one of the series of packets contains data representing an executable code module and includes identification information indicating that the first one of the series of packets contains data representing an executable code module;

a second one of the series of packets contains data representing a data module and includes identification information indicating that the second one of the series of packets contains data representing a data module;

a third one of the series of packets contains data representing said directory module inter-relating respective transmitted modules associated with a single distributed computing application, and includes identification information indicating that the third one of the series of packets contains data representing said directory module; and a fourth one of the series of packets contains auxiliary data and includes identification information indicating that the fourth one of the series of packets contains auxiliary data.]

[9. In a distributed computer system, a client computer, comprising:

an input terminal for receiving a packet data stream including packets of video signal time multiplexed with packets of data representing a distributed computing application which distributed computing application is repetitively transmitted independently of said client computer and at least one of the packets representing the distributed computing application includes a directory containing information inter-relating ones of the packets containing said distributed computing application;

a data stream receiver, coupled to said input terminal, for receiving the data stream, providing separate data streams of said video signal and said distributed computing application, extracting said directory packet and responsive to the directory, extracting packets containing said distributed computing application representative data; and a processing unit, coupled to the data stream receiver, for assembling said distributed computing application and executing the distributed computing application comprising:

a system bus;

read/write memory, coupled to the system bus;

a data stream input/output adapter, coupled between the data stream receiver and the system bus, for receiving the extracted distributed computing application representative data from the data stream receiver, and storing it in the read/write memory, and having a control output terminal coupled to the selection control input terminal of the data stream selector, for producing the selection control signal; and a processor, coupled to the system bus, for controlling the data stream input/output device to generate a selection control signal selecting a specified one of the plurality of data streams, and for assembling and executing the distributed computing application stored in the read/write memory.]

*10. A method to facilitate placing an order for an item, the method comprising:*

*at a source of a data stream, providing a series of time division multiplexed packets, ones of which contain auxiliary data that represent a video program, and others of which represent a distributed computing application associated with said video program, and wherein said distributed computing application is repetitively transmitted independent of receiving client computer apparatus during times that said video program is transmitted;*

*receiving an order request at a client system, the client system comprising a packet selector connected to said source for selecting and directing packets containing said auxiliary data representing said video program to a video signal processor and selecting and directing packets containing said associated distributed computing application to a further processor, said further processor including means to assemble said distributed computing application and execute said distributed computing application to form an interactive video program with an executable code, in which execution of said distributed computing application alters said video program, the executable code causing, at a client system, display of the interactive information associated with the video program while the video program is being shown at the client system, the interactive information associated with the video program describing an item to said video program viewer, the receiving of the order request at the client system is via the interactive information displayed at the client system;*

*automatically determining an item identity for an item to which the order request pertains; and*

*causing an order to be placed, the order including the item identity.*

*11. The method of claim 10 wherein the order request is received at the client system through detection of an order action by the user utilizing the client system.*

*12. The method of claim 11 wherein the order action is performed during the showing and/or describing of the item via the client system.*

*13. The method of 11 wherein the order action includes input of the item identity into the client system.*

*14. The method of claim 11 including receiving information, at the client system from the server system, related to the item and wherein the automatic determination of the item identity includes relating the order action to the received information related to the item.*

*15. The method of claim 14 wherein the relating includes the detecting of the order action during an offer of the item as specified by any one of a group including a code and a command included within the received information related to the item.*

*16. The method of claim 15 wherein the code is received within data transmitted from a server system to the client system.*

*17. The method of claim 11 including prompting the user to perform the order action utilizing the client system.*

*18. The method of claim 17 wherein the prompting includes communicating any one of group of prompts including a visual prompt and an audio prompt.*

*19. The method of claim 18 wherein the prompt includes any of a group including instructions, options and a menu.*

*20. The method of claim 17 wherein the prompting includes generating an audio prompt via an audio reproduction unit of the client system.*

*21. The method of claim 20 wherein the prompting includes generating an audio prompt via an audio reproduction unit of the client system.*

*22. The method of claim 11 wherein the detection of the order action includes detecting an interaction by the user with a control device of the client system.*

*23. The method of claim 22 wherein the interaction comprises a single action operation performed by the user.*

*24. The method of claim 23 wherein the single action operation comprises a single selection of a button of a remote control device.*

*25. The method of claim 10 wherein the item identity is received within data transmitted from a server system to the client system.*

*26. The method of claim 25 wherein the data includes multiplexed first and second streams of packets, the first stream of packets including display information to generate an image on a display of the client system, and the second stream of packets including an computing application.*

*27. The method of claim 26 wherein the second stream of packets includes code modules that comprise the computing application and data modules including data to be processed by the computing application.*

*28. The method of claim 10 wherein the retrieved personal information is retrieved from a storage device accessible by the client system and wherein the order is caused to be placed by the client system by a communication with the server system.*

*29. The method of claim 10 including receiving a client application program at the client system from the server system, the client application program to receive the order request and to cause the order to be placed.*

*30. The method of claim 29 wherein the client application program is received as part of data including content for display by the client system.*

*31. The method of claim 10 including receiving, at the client system from a server system, an order confirmation.*

*32. The method of claim 10, wherein the client system is associated with a television receiver.*

*33. The method of claim 10, wherein the client system is associated with a television set-top box.*

*34. A client system including:*

*an input terminal for receiving a packet data stream including packets of video signal time multiplexed with packets of data representing a distributed computing application which distributed computing application is repetitively transmitted independently of said client computer and at least one of the packets representing the distributed computing application includes a directory containing information inter-relating ones of the packets containing said distributed computing application;*

*a receiver, coupled to said input terminal, to receive the data stream including information related to an item, providing separate data streams of said video signal and said distributed computing application, extracting said directory packet and responsive to the directory, extracting packets containing said distributed computing application representative data; and*

*a processing unit, coupled to the data stream receiver, for assembling said distributed computing application and executing the distributed computing application to form an interactive video program with an executable code in which execution of said distributed computing application alters said interactive video program, the executable code causing, at the client system, display of interactive information associated with the video program while the interactive video program is being shown at*

*the client system, the interactive information associated with the video program describing an item, the processing unit comprising:*

*a system bus;*

*read/write memory, coupled to the system bus;*

*a data stream input/output adapter, coupled between the data stream receiver and the system bus, for receiving the extracted distributed computing application representative data from the data stream receiver, and storing it in the read/write memory, and having a control output terminal coupled to the selection control input terminal of the data stream selector, for producing the selection control signal; and*

*a processor, coupled to the system bus, for controlling the data stream input/output device to generate a selection control signal selecting a specified one of the plurality of data streams, and for assembling and executing the distributed computing application stored in the read/write memory,*

*the processing unit to:*

*receive an order request at the client system via the interactive information displayed at the client system;*

*automatically determine an item identity for the item utilizing the information related to the item; and*

*cause an order to be placed, the order including the item identity.*

*35. The system of claim 34 wherein the processing unit is to receive the order request through detection of an order action by the user.*

*36. The system of claim 35 wherein processing unit is to detect the order action during the showing and/or describing of the item by the client system utilizing the information related to the item.*

*37. The system of claim 35 wherein the processing unit is to receive input of the item identity as part of the order action.*

*38. The system of claim 35 wherein the processing unit is to relate the order action to the information related to the item.*

*39. The system of claim 35 wherein the processing unit to detect the order action during an offer of the item as specified any one of a group including by a code and a command included within the information related to the item.*

*40. The system of claim 35 wherein the processing unit and/or the receiver is to prompt the user to perform the order action utilizing the client system.*

*41. The system of claim 40 wherein the processing unit and/or the receiver is to communicate a prompt via the client system.*

*42. The system of claim 41 wherein the prompt includes any of a group including an indicia, instructions and a menu.*

*43. The system of claim 35 wherein the processing unit is to detect the order action by detecting an interaction by the user with a control device of the client system.*

*44. The system of claim 43 wherein the interaction comprises a single action operation performed by the user.*

*45. The system of claim 44 wherein the single action operation comprises a single selection of a button of a remote control device.*

*46. The system of claim 34 wherein the receiver is to receive the data as multiplexed first and second streams of packets, the first stream of packets including display information to generate an image on a display of the client system, and the second stream of packets including information to be processed by an computing application, the receiver further including a first extractor to extract the first stream of packets from the data and a second extractor to extract the second stream of packets from the data.*

*47. The system of claim 46 wherein the second stream of packets includes at least a portion of the computing application.*

*48. The system of claim 34 wherein the processing unit and/or the receiver is to generate an audio prompt via an audio reproduction unit of the client system.*

*49. The system of claim 48 wherein the audio prompt comprises any one of a group including instructions, options and a menu.*

*50. The system of claim 34 including a storage medium from which the retrieved personal information is retrieved and wherein the order is placed by the client system utilizing a communication with a server system.*

*51. The system of claim 34 wherein the receiver to receive a client application program from a server system, the client application program being executable by the processing unit to receive the order request and to place the order.*

*52. The system of claim 51 wherein the receiver is to receive the client application program as part of the data.*

*53. The system of claim 34 wherein the receiver is to receive an order confirmation.*

*54. An interactive television system, the system including:*

*an input terminal for receiving a packet data stream including packets of video signal time multiplexed with packets of data representing a distributed computing application which distributed computing application is repetitively transmitted independently of said client computer and at least one of the packets representing the distributed computing application includes a directory containing information inter-relating ones of the packets containing said distributed computing application;*

*a receiver, coupled to said input terminal, to receive the data stream including information related to an item, providing separate data streams of said video signal and said distributed computing application, extracting said directory packet and responsive to the directory, extracting packets containing said distributed computing application representative data; and*

*a processing unit, coupled to the data stream receiver, for assembling said distributed computing application and executing the distributed computing application to form an interactive video program with an executable code in which execution of said distributed computing application alters said video program, the executable code causing, at a client system, display of interactive information associated with the video program while the video program is being shown at the client system, the interactive information associated with the video program describing an item to said video program viewer, the processing unit comprising:*

*a system bus;*

*read/write memory, coupled to the system bus;*

*a data stream input/output adapter, coupled between the data stream receiver and the system bus, for receiving the extracted distributed computing application representative data from the data stream receiver, and storing it in the read/write memory, and having a control output terminal coupled to the selection control input terminal of the data stream selector, for producing the selection control signal; and*

*a processor, coupled to the system bus, for controlling the data stream input/output device to generate a selection control signal selecting a specified one of*

*the plurality of data streams, and for assembling and executing the distributed computing application stored in the read/write memory,*

*the processing unit to:*

*receive an order request at the client system via the interactive information displayed at the client system;*

*automatically determine an item identity for the item utilizing the information related to the item; and*

*cause an order to be placed, the order including the item identity.*

*55. The interactive television system of claim 54, wherein the receiver and the processing unit reside in a television set-top box.*

* * * * *

UNITED STATES PATENT AND TRADEMARK OFFICE

CERTIFICATE OF CORRECTION

PATENT NO. : RE44,685 E
APPLICATION NO. : 09/903457
DATED : December 31, 2013
INVENTOR(S) : Kuriacose Joseph et al.

It is certified that error appears in the above-identified patent and that said Letters Patent is hereby corrected as shown below:

Item (56) References Cited:

On the title page, under "Other Publications", line 1, delete "Zachary" and insert --Zachary,--, therefor On the title page, under "Other Publications", line 2, delete "Interactive";" and insert --Interactive",--, therefor On title page 3, in column 1, under "Other Publications", line 1, delete "D, et al." and insert --D., et al.,--, therefor On title page 3, in column 1, under "Other Publications", line 8, delete "P," and insert --P.,--, therefor On title page 3, in column 1, under "Other Publications", line 8, delete "Flexable" and insert --Flexible--, therefor On title page 3, in column 1, under "Other Publications", line 12, delete "Andrew.," and insert --Andrew,--, therefor On title page 3, in column 2, under "Other Publications", line 7, delete "maketplace:" and insert --marketplace:--, therefor On title page 3, in column 2, under "Other Publications", line 69, delete "J," and insert --J.,--, therefor On title page 3, in column 2, under "Other Publications", line 71, delete "Ammar M H, Wong JW," and insert --Ammar, M. H., Wong, J. W.,--, therefor On title page 4, in column 1, under "Other Publications", line 1, delete "Gifford D K, Lucassen J M, Berlin S T," and insert --Gifford, D. K., Lucassen, J. M., Berlin, S. T.,--, therefor Signed and Sealed this
Seventeenth Day of June, 2014

Michelle K. Lee

Michelle K. Lee
*Deputy Director of the United States Patent and Trademark Office*

On title page 4, in column 1, under "Other Publications", line 2, delete "Systems"" and insert --Systems",--, therefor On title page 4, in column 1, under "Other Publications", line 5, delete "Wong J W," and insert --Wong, J. W.,--, therefor On title page 4, in column 1, under "Other Publications", line 7, delete "Herman G, Gopal G, Lee K C, Weinrib A," and insert --Herman, G., Gopal, G., Lee, K. C., Weinrib, A.,--, therefor On title page 4, in column 1, under "Other Publications", line 8, delete "Systems"" and insert --Systems",--, therefor On title page 4, in column 1, under "Other Publications", line 13, delete "Gifford D K" and insert --Gifford, D. K.,--, therefor On title page 4, in column 1, under "Other Publications", line 13-14, delete "Communication"" and insert --Communication",--, therefor On title page 4, in column 1, under "Other Publications", line 15-16, delete "Bowen T F, Goapl G, Herman G, Hickey T, Lee K C, Mansfield W H, Raitz J, Weinrib A," and insert --Bowen, T. F., Gopal, G., Herman, G., Hickey, T., Lee, K. C., Mansfield, W. H., Raitz, J., Weinrib, A.,--, therefor On title page 4, in column 1, under "Other Publications", line 17, delete "Architecture"" and insert --Architecture",--, therefor On title page 4, in column 1, under "Other Publications", line 19, delete "Antonelli C J, Honeyman P," and insert --Antonelli, C. J., Honeyman, P.,--, therefor On title page 4, in column 1, under "Other Publications", line 22, delete "Zdonik S," and insert --Zdonik, S.,--, therefor On title page 4, in column 1, under "Other Publications", line 22, delete "Sky?"" and insert --Sky?",--, therefor On title page 4, in column 1, under "Other Publications", line 27, delete "Acharya S, Alonso R, Franlin M, Zdonik S," and insert --Acharya, S., Alonso, R., Franlin, M., Zdonik, S.,--, therefor On title page 4, in column 1, under "Other Publications", line 28, delete "Environments"" and insert --Environments",--, therefor On title page 4, in column 1, under "Other Publications", line 32, delete "Acharya S, Alonso R, Franlin M, Zdonik S," and insert --Acharya, S., Alonso, R., Franlin, M., Zdonik, S.,--, therefor On title page 4, in column 1, under "Other Publications", line 33, delete "Disks"" and insert --Disks",--, therefor On title page 4, in column 1, under "Other Publications", line 35, delete "Inielinski T, Viswanathan S, Badrinath B R," and insert --Inielinski, T., Viswanathan, S., Badrinath, B. R.,--, therefor On title page 4, in column 1, under "Other Publications", line 36, delete "Air"" and insert --Air",--, therefor On title page 4, in column 1, under "Other Publications", line 41, delete "Inielinski T, Viswanathan S, Badrinath B R," and insert --Inielinski, T., Viswanathan, S., Badrinath, B. R.,--, therefor On title page 4, in column 1, under "Other Publications", line 42, delete "Air"" and insert --Air",--, therefor On title page 4, in column 1, under "Other Publications", line 45, delete "Inielinski T, Badrinath B R," and insert --Inielinski, T., Badrinath, B. R.,--, therefor On title page 4, in column 1, under "Other Publications", line 45, delete "Computing"" and insert --Computing",--, therefor On title page 4, in column 1, under "Other Publications", line 56, delete "Poole" and insert --Poole,--, therefor On title page 4, in column 1, under "Other Publications", line 58, delete "Palm-Top" and insert --Palmtop--, therefor On title page 4, in column 1, under "Other Publications", line 60, delete "G Pascal," and insert --G. Pascal--, therefor On title page 4, in column 2, under "Other Publications", line 5, delete "P.M.," and insert --P. M.,--, therefor On title page 4, in column 2, under "Other Publications", line 10, delete ""Matsushit" and insert --"Matsushita--, therefor On title page 4, in column 2, under "Other Publications", line 19, delete "J.P.," and insert --J. P.,--, therefor On title page 4, in column 2, under "Other Publications", line 22, delete "W.G.," and insert --W. G.,--, therefor On title page 4, in column 2, under "Other Publications", line 31, delete "VPT" and insert --"VPT--, therefor On title page 4, in column 2, under "Other Publications", line 31, delete "VHSVCR," and insert --VHSVCR",--, therefor On title page 4, in column 2, under “Other Publications”, line 48, delete “D.J.,” and insert --D. J.,--, therefor On title page 5, in column 1, under “Other Publications”, line 1, delete “L.J.,” and insert --L. J.,--, therefor On title page 5, in column 1, under “Other Publications”, line 10, delete “Smithson; P.M.,” and insert --Smithson, P. M.,--, therefor On title page 5, in column 1, under “Other Publications”, line 28, delete “R.G.,” and insert --R. G.,--, therefor On title page 5, in column 2, under “Other Publications”, line 9, delete “Mailed” and insert --mailed--, therefor On title page 5, in column 2, under “Other Publications”, line 22, delete “Mailed” and insert --mailed--, therefor On title page 5, in column 2, under “Other Publications”, line 24, delete “Mailed” and insert --mailed--, therefor On title page 5, in column 2, under “Other Publications”, line 44, delete “maild” and insert --mailed--, therefor On title page 6, in column 1, under “Other Publications”, line 44, delete “09/903,448” and insert --09/903,448,--, therefor On title page 6, in column 1, under “Other Publications”, line 50, delete “09/903,458” and insert --09/903,458,--, therefor On title page 6, in column 1, under “Other Publications”, line 52, delete “09/903,458” and insert --09/903,458,--, therefor On page 6, in column 2, under “Other Publications”, line 14, delete “Mailed” and insert --mailed--, therefor On title page 6, in column 2, under “Other Publications”, line 37, delete “2010-185225-Office” and insert --2010-185225, Office--, therefor On title page 6, in column 2, under “Other Publications”, line 41, delete “J R,” and insert --J. R.,--, therefor On title page 7, in column 2, under “Other Publications”, line 25, delete “09/672,523” and insert --09/672,523,--, therefor In the Claims:

In column 19, line 19, in Claim 34, after “memory,”, insert --and--, therefor

In column 21, line 3, in Claim 54, after “memory,”, insert --and--, therefor